US011935473B2

(12) United States Patent
Nakamura et al.

(10) Patent No.: US 11,935,473 B2
(45) Date of Patent: Mar. 19, 2024

(54) DISPLAY DEVICE AND METHOD FOR DRIVING SAME

(71) Applicant: Sharp Kabushiki Kaisha, Sakai (JP)

(72) Inventors: Yousuke Nakamura, Sakai (JP); Masaaki Nishio, Sakai (JP); Noriyuki Tanaka, Sakai (JP); Hongbing Weng, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 22 days.

(21) Appl. No.: 17/791,246

(22) PCT Filed: Jan. 31, 2020

(86) PCT No.: PCT/JP2020/003614

§ 371 (c)(1),
(2) Date: Jul. 7, 2022

(87) PCT Pub. No.: WO2021/152814

PCT Pub. Date: Aug. 5, 2021

(65) Prior Publication Data

US 2023/0351960 A1 Nov. 2, 2023

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2320/0247* (2013.01); *G09G 2320/0257* (2013.01)

(58) Field of Classification Search
CPC ......... G09G 3/3233; G09G 2300/0819; G09G 2300/0842; G09G 2300/0861; G09G 2320/0247; G09G 2320/0257
See application file for complete search history.

(56) References Cited

U.S. PATENT DOCUMENTS

| | | | | |
|---|---|---|---|---|
| 9,950,186 | B2 * | 4/2018 | Kim | G06T 5/002 |
| 11,211,031 | B2 * | 12/2021 | An | G09G 3/3266 |
| 2015/0138258 | A1 * | 5/2015 | Lee | G09G 3/3233 345/691 |
| 2018/0130408 | A1 * | 5/2018 | Zhou | G09G 3/3225 |
| 2018/0342202 | A1 * | 11/2018 | Sung | G09G 5/003 |
| 2020/0286429 | A1 * | 9/2020 | Orio | G09G 3/3241 |

(Continued)

FOREIGN PATENT DOCUMENTS

JP 2008-185905 A 8/2008

*Primary Examiner* — Bryan Earles
(74) *Attorney, Agent, or Firm* — Keating & Bennett, LLP

(57) ABSTRACT

In a display device that changes the number of light emissions per frame period, a display control circuit outputs a control signal specifying an emission period included in a frame period to an emission control line driver circuit. The emission control line driver circuit adds sequential delays to the control signal and thereby generates signals to be applied to the emission control lines. When leading and trailing frame periods have the same proportion of emission periods but include different numbers of emission periods, the leading and trailing frame periods are intervened by a transition frame period having a different proportion of emission periods from the leading frame period. This configuration prevents flickering caused by the changing of the number of light emissions per frame period.

15 Claims, 29 Drawing Sheets

(56) References Cited

U.S. PATENT DOCUMENTS

| | | | | |
|---|---|---|---|---|
| 2020/0402478 | A1* | 12/2020 | Her | G09G 3/3233 |
| 2021/0142742 | A1* | 5/2021 | Ishii | G09G 3/3233 |
| 2021/0201793 | A1* | 7/2021 | Lin | G09G 3/3233 |

* cited by examiner

DISPLAY DEVICE AND METHOD FOR DRIVING SAME

TECHNICAL FIELD

The disclosure relates to display devices, particularly to a self-luminous display device.

BACKGROUND ART

Recent years have seen practical application of organic EL display devices that include pixel circuits incorporating organic electro-luminescent (abbreviated below as EL) elements as light-emitting elements. Such organic EL display devices are susceptible to display screen flickering. Accordingly, there are a large number of organic EL display devices that employ flickering prevention measures in which the organic EL elements are configured to emit light a plurality of times per frame period. However, the organic EL display devices that employ such measures might show afterimages while displaying a video.

Even in the case of an organic EL display device that causes organic EL elements to emit light only once per frame period, employing a frame rate higher than 60 Hz renders it possible to reduce afterimages while preventing flickering. However, increasing the frame rate results in increased power consumption of the organic EL display device.

In relation to the disclosure of the present application, Patent Document 1 describes a video display device in which each pixel is configured to emit light a plurality of times during one frame period, but if the pixel is located within a video image area identified in a frame image, the light emission of the pixel is limited to once.

CITATION LIST

Patent Document

Patent Document 1: Japanese Laid-Open Patent Publication No. 2008-185905

SUMMARY

Technical Problem

The organic EL display device can conceivably be configured to change the number of light emissions per frame period in order to prevent flickering without increasing power consumption. In such an organic EL display device, the proportion of light emission periods in a frame period can be set to remain the same before and after the changing of the number of light emissions, so that the organic EL display device can maintain the same display luminance before and after the changing of the number of light emissions.

However, during a frame period immediately after the changing of the number of light emissions, the observer perceives a level of luminance different from that perceived during the previous and following frame periods (see FIG. 13 and descriptions thereof to be provided later). The observer perceives such luminance changes as flickering.

Accordingly, the organic EL display device that changes the number of light emissions per frame period has a problem with display screen flickering caused by the changing of the number of light emissions.

Therefore, a problem to be solved is to provide a display device capable of preventing flickering caused by the changing of the number of light emissions per frame period.

Solution to the Problems

The above problem can be solved, for example, by a display device including: a display portion including a plurality of scanning lines, a plurality of data lines, a plurality of emission control lines, and a plurality of pixel circuits incorporating respective light-emitting elements; a scanning line driver circuit configured to drive the scanning lines; a data line driver circuit configured to drive the data lines; an emission control line driver circuit configured to drive the emission control lines; and a display control circuit configured to output a control signal to the emission control line driver circuit, the control signal specifying an emission period included in a frame period. The emission control line driver circuit adds sequential delays to the control signal and thereby generates signals to be applied to the emission control lines. When leading and trailing frame periods have the same proportion of emission periods but include different numbers of emission periods, the leading and trailing frame periods are intervened by a transition frame period having a different proportion of emission periods from the leading frame period.

The above problem can also be solved by a method for driving a display device having a display portion that includes a plurality of scanning lines, a plurality of data lines, a plurality of emission control lines, and a plurality of pixel circuits incorporating respective light-emitting elements. The method includes the steps of: driving the scanning lines; driving the data lines; driving the emission control lines; and outputting a control signal for the step of driving the emission control lines, the control signal specifying an emission period included in a frame period. The step of driving the emission control lines includes adding sequential delays to the control signal and thereby generating signals to be applied to the emission control lines. When leading and trailing frame periods have the same proportion of emission periods but include different numbers of emission periods, the leading and trailing frame periods are intervened by a transition frame period having a different proportion of emission periods from the leading frame period.

Effect of the Disclosure

In the above display device and the method for driving the same, where the number of light emissions per frame period is changed during a transition from the leading frame period to the trailing frame period, the leading and trailing frame periods are intervened by a transition frame period having a different proportion of emission periods from the leading frame period. This renders it possible to properly change the luminance that is to be seen by the observer in the opposite direction and thereby prevent flickering caused by the changing of the number of light emissions.

DESCRIPTION OF EMBODIMENTS

Hereinafter, display devices according to embodiments will be described with reference to the drawings. The display devices according to the embodiments are organic EL display devices that include pixel circuits incorporating organic EL elements. The organic EL element is one type of light-emitting element and is also referred to as the organic light-emitting diode or OLED. In the following descriptions, the horizontal and vertical directions in figures will be referred to as the row and column directions, respectively. Moreover, m and n are integers of 2 or more, i is an integer from 1 to m, and j is an integer from 1 to n.

First Embodiment

Figure 1:
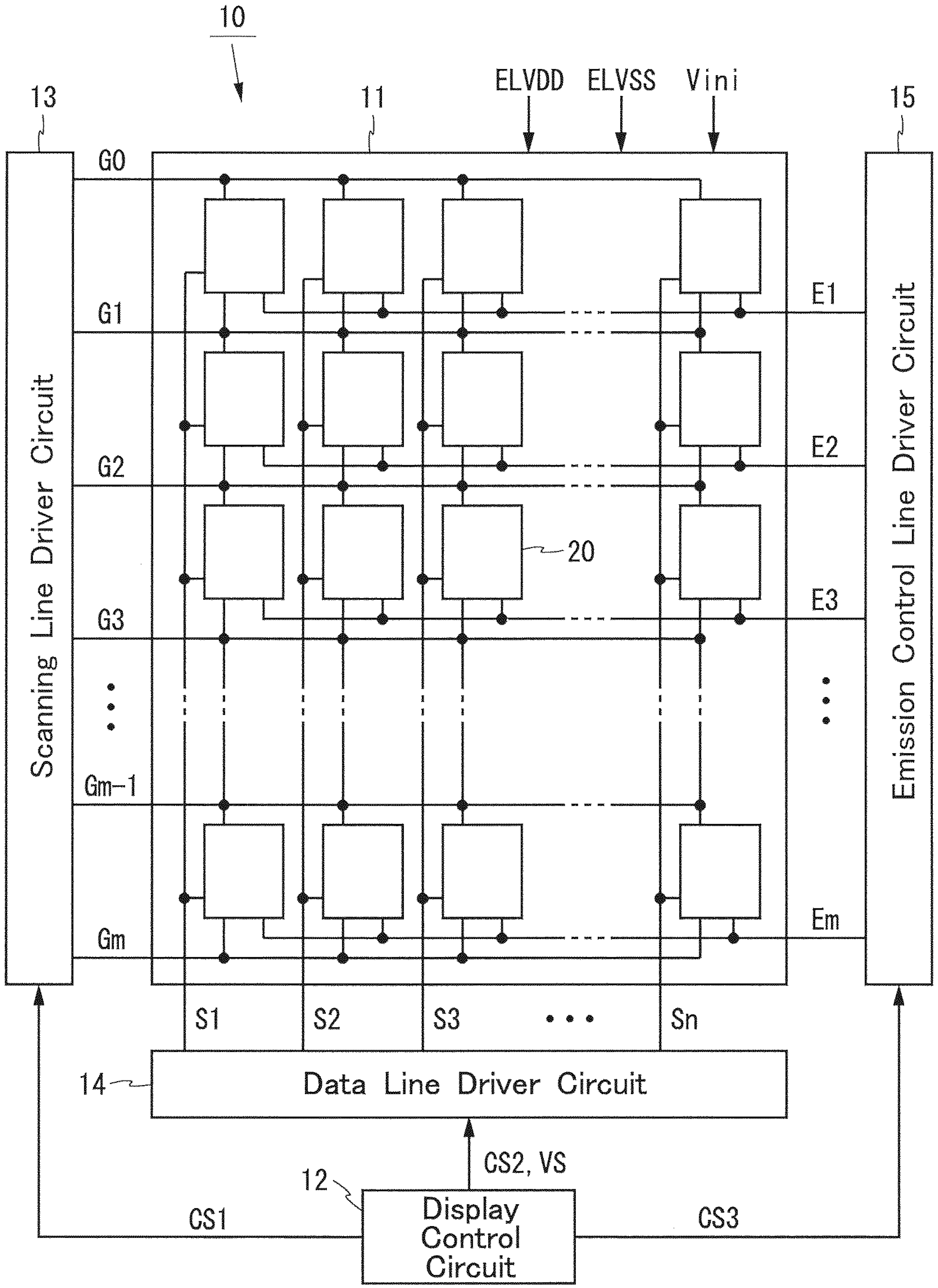
FIG. 1 is a block diagram illustrating the configuration of a display device according to a first embodiment.

FIG. 1 is a block diagram illustrating the configuration of a display device according to a first embodiment. The display device 10 shown in FIG. 1 includes a display portion 11, a display control circuit 12, a scanning line driver circuit 13, a data line driver circuit 14, and an emission control line driver circuit 15.

The display portion 11 includes (m+1) scanning lines G0 to Gm, n data lines S1 to Sn, m emission control lines E1 to Em, and (m×n) pixel circuits 20. The scanning lines G0 to Gm extend in the row direction so as to be parallel to one another. The data lines S1 to Sn extend in the column direction so as to be parallel to one another and perpendicular to the scanning lines G1 to Gm. The emission control lines E1 to Em extend in the row direction so as to be parallel to the scanning lines G0 to Gm. The scanning lines G1 to Gm and the data lines S1 to Sn intersect at (m×n) points. The (m×n) pixel circuits 20 are arranged in a two-dimensional manner so as to correspond to the intersection points of the scanning lines G1 to Gm and the data lines S1 to Sn. Each pixel circuit 20 is supplied with a high-level source voltage ELVDD, a low-level source voltage ELVSS, and an initialization voltage Vini through unillustrated conductive members (conductors or electrodes).

The display control circuit 12 outputs a control signal CS1 to the scanning line driver circuit 13, a control signal CS2 and video signals VS to the data line driver circuit 14, and a control signal CS3 to the emission control line driver circuit 15. The scanning line driver circuit 13 drives the scanning lines G0 to Gm based on the control signal CS1. The data line driver circuit 14 drives the data lines S1 to Sn based on the control signal CS2 and the video signals VS. The emission control line driver circuit 15 drives the emission control lines E1 to Em based on the control signal CS3.

More specifically, the scanning line driver circuit 13 sequentially selects the scanning lines G0 to Gm one by one based on the control signal CS1, and applies a selection voltage (here, a low-level voltage) to the scanning line that is being selected, thereby collectively selecting n pixel circuits 20 connected to that scanning line. The data line driver circuit 14 applies n data voltages, which correspond to the video signals VS, to the respective data lines S1 to Sn based on the control signal CS2. As a result, the n data voltages are written to the n pixel circuits 20 that are being selected.

The pixel circuits 20 in each row are assigned emission and non-emission periods. During the emission period for the i'th-row pixel circuits 20, the emission control line driver circuit 15 applies an emission voltage (here, a low-level voltage) to the emission control line Ei. During the non-emission period for the i'th-row pixel circuits 20, the emission control line driver circuit 15 applies a non-emission voltage (here, a high-level voltage) to the emission control line Ei. During the emission period for the i'th-row pixel circuits 20, the organic EL elements in the i'th-row pixel circuits 20 emit light with luminances corresponding to the data voltages written in the i'th-row pixel circuits 20.

Figure 2:
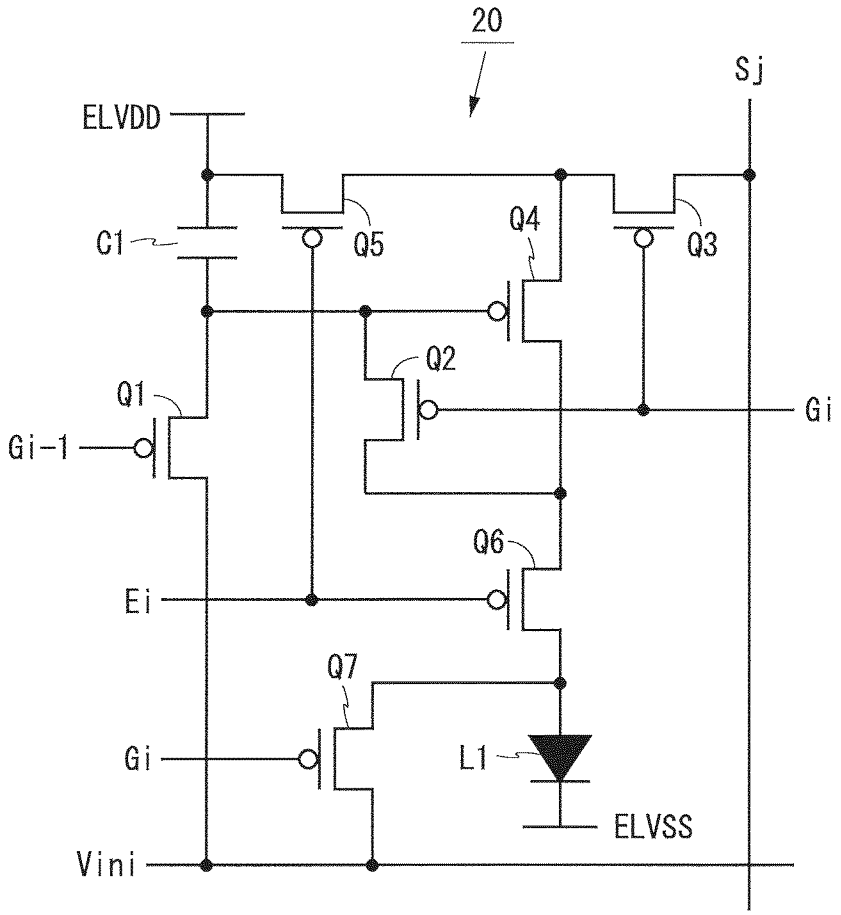
FIG. 2 is a circuit diagram of a pixel circuit in the display device shown in FIG. 1.

FIG. 2 is a circuit diagram of the pixel circuit 20. The pixel circuit 20 shown in FIG. 2 is the i'th-row, j'th-column pixel circuit, and includes seven thin-film transistors (referred to below as TFTs) Q1 to Q7, an organic EL element L1, and a capacitor C1. The TFTs Q1 to Q7 are P-channel transistors. The pixel circuit 20 is connected to the scanning lines Gi−1 and Gi, the data line Sj, and the emission control line Ei. The scanning line Gi−1 is selected one horizontal period earlier than the scanning line Gi.

It should be noted that the TFTs included in the pixel circuit 20 may be amorphous silicon transistors with channel layers formed of amorphous silicon, low-temperature polysilicon transistors with channel layers formed of low-temperature polysilicon, or oxide semiconductor transistors with channel layers formed of oxide semiconductor. An example of the oxide semiconductor is indium gallium zinc oxide (IGZO). Moreover, the TFTs included in the pixel circuit 20 may be of a top-gate type or a bottom-gate type. Further, the pixel circuit 20, which includes P-channel transistors, may be replaced by a pixel circuit that includes N-channel transistors. In the case where the pixel circuit includes N-channel transistors, the signals and source voltages that are to be supplied to the pixel circuit are inverted in polarity.

The TFT Q5 receives the high-level source voltage ELVDD at a source terminal, and the capacitor C1 also receives the high-level source voltage ELVDD at one electrode (in FIG. 2, upper electrode). The TFT Q3 is connected to the data line Sj at one conductive terminal (in FIG. 2, right conductive terminal) and to a source terminal of the TFT Q4 at the other conductive terminal. The source terminal of the TFT Q4 is also connected to a drain terminal of the TFT Q5. The TFT Q4 is connected at a drain terminal to one conductive terminal of the TFT Q2 (in FIG. 2, lower conductive terminal) and a source terminal of the TFT Q6. The TFT Q6 is connected at a drain terminal to an anode terminal of the organic EL element L1 and a source terminal of the TFT Q7. The organic EL element L1 receives the low-level source voltage ELVSS at a cathode terminal. The TFT Q2 is connected at the other conductive terminal to a gate terminal of the TFT Q4, the other electrode of the capacitor C1, and a source terminal of the TFT Q1. The TFTs Q1 and Q7 receive the initialization voltage Vini at drain terminals. The TFT Q1 is connected to the scanning line Gi−1 at a gate terminal. The TFTs Q2, Q3, and Q7 are connected to the scanning line Gi at gate terminals. The TFTs Q5 and Q6 are connected to the emission control line Ei at gate terminals.

Figure 3:
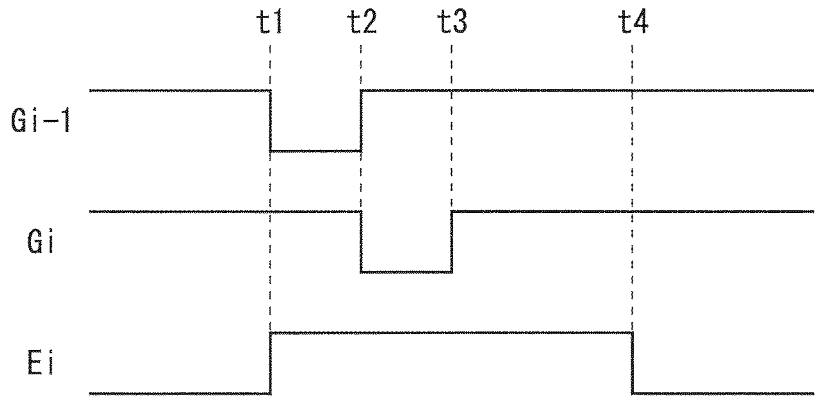
FIG. 3 is a timing chart for the pixel circuit shown in FIG. 2.

FIG. 3 is a timing chart for the pixel circuit 20. Before time t1, the scanning lines Gi−1 and Gi have a high-level voltage, and the emission control line Ei has a low-level voltage. Accordingly, the TFTs Q1 to Q3 and Q7 are in OFF state, and the TFTs Q5 and Q6 are in ON state. In this case, if the TFT Q4 has a gate-source voltage less than or equal to a threshold voltage of the TFT Q4, the organic EL element L1 emits light with a luminance corresponding to the amount of current flowing from a conductive member with the high-level source voltage ELVDD to a conductive member with the low-level source voltage ELVSS by way of the TFT Q5, the TFT Q4, the TFT Q6, and the organic EL element L1.

At time t1, the voltage on the scanning line Gi−1 transitions to low level, and the voltage on the emission control line Ei transitions to high level. Correspondingly, the TFT Q1 is turned on, and the TFTs Q5 and Q6 are turned off. After the TFTs Q5 and Q6 are turned off at time t1, no current flows through the organic EL element L1, so that the organic EL element L1 emits no light. Moreover, as a result of the TFT Q1 being turned on, the TFT Q4 has a gate voltage equal to the initialization voltage Vini. The level of the initialization voltage Vini is set so low that the TFT Q4 is turned on immediately after the voltage on the scanning line Gi transitions to low level (i.e., immediately after time t2).

Next, at time t2, the voltage on the scanning line Gi−1 transitions to high level, and the voltage on the scanning line Gi transitions to low level. Correspondingly, the TFT Q1 is turned off, and the TFTs Q2, Q3, and Q7 are turned on. As a result of the TFT Q7 being turned on, the anode terminal of the organic EL element L1 has a voltage equal to the initialization voltage Vini. Moreover, as a result of the TFT Q2 being turned on, the TFT Q4 is diode-connected. Accordingly, a current flows from the data line Sj to the gate terminal of the TFT Q4 by way of the TFT Q3, the TFT Q4, and the TFT Q2, resulting in an increased gate voltage of the TFT Q4. Once the gate-source voltage of the TFT Q4 becomes equal to the threshold voltage of the TFT Q4, no current flows through the TFT Q4. Assuming that the threshold voltage of the TFT Q4 is Vth (<0) and that the data voltage that is applied to the data line Sj from time t2 to time t3 is Vd, the gate voltage of the TFT Q4 immediately before time t3 is (Vd−|Vth|.

Next, at time t3, the voltage on the scanning line Gi transitions to high level. Correspondingly, the TFTs Q2, Q3, and Q7 are turned off. After time t3, the capacitor C1 maintains an interelectrode voltage (ELVDD−Vd+|Vth|).

Next, at time t4, the voltage on the emission control line Ei transitions to low level. Correspondingly, the TFTs Q5 and Q6 are turned on. After time t4, a current flows from the conductive member with the high-level source voltage ELVDD to the conductive member with the low-level source voltage ELVSS by way of the TFT Q5, the TFT Q4, the TFT Q6, and the organic EL element L1. The gate-source voltage Vgs of the TFT Q4 is maintained at (ELVDD−Vd+|Vth|) by the operation of the capacitor C1. Accordingly, the current Id that flows through the organic EL element L1 after time t4 can be given by the following equation (1) using constant K:

$$Id=K(Vgs-|Vth|)^2=K(\mathrm{ELVDD}-Vd+|Vth|-|Vth|)^2=K(\mathrm{ELVDD}-Vd)^2 \quad (1)$$

After time t4, the organic EL element L1 emits light with a luminance corresponding to the data voltage Vd written in the pixel circuit 20, regardless of the threshold voltage Vth of the TFT Q4.

Figure 4:
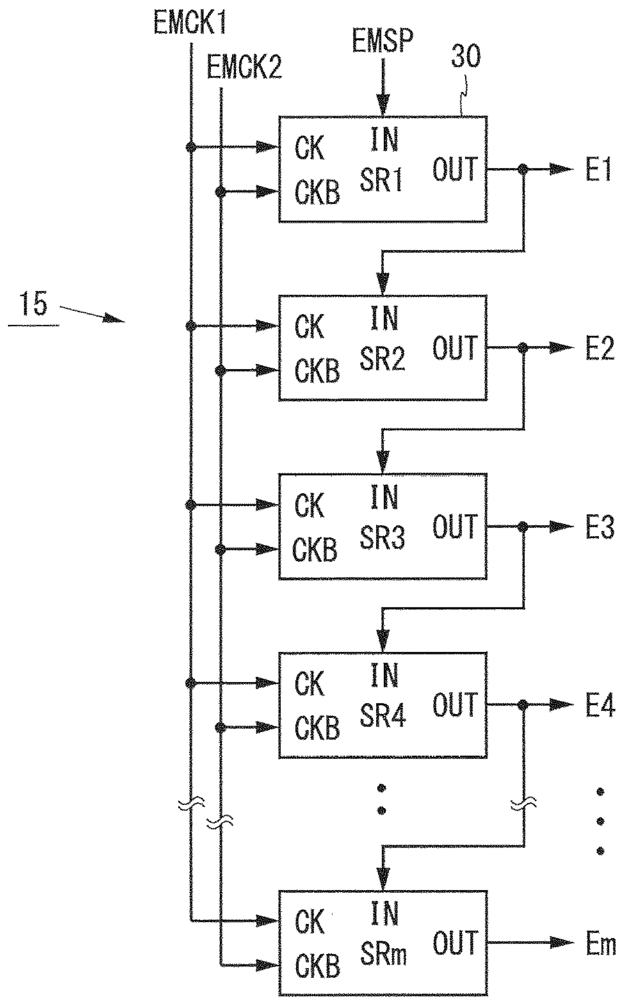
FIG. 4 is a block diagram illustrating the configuration of an emission control line driver circuit in the display device shown in FIG. 1.

FIG. 4 is a block diagram illustrating the configuration of the emission control line driver circuit 15. The emission control line driver circuit 15 shown in FIG. 4 is configured by cascading m unit circuits 30 in stages. The unit circuit 30 has clock terminals CK and CKB, an input terminal IN, and an output terminal OUT.

The control signal CS3, which is outputted to the emission control line driver circuit 15 by the display control circuit 12, includes two emission clocks EMCK1 and EMCK2 and an emission start pulse EMSP. The emission clock EMCK1 is provided to the clock terminals CK of all of the cascaded unit circuits 30. The emission clock EMCK2 is an inverted signal of the emission clock EMCK1, and is provided to the clock terminals CKB of all of the cascaded unit circuits 30. The emission start pulse EMSP is provided to the input terminal IN of the first-stage unit circuit 30. The input terminals IN of the second- to m'th-stage unit circuits 30 receive respective signals outputted from the output terminals OUT of the first- to (m−1)'th-stage unit circuits 30. The output terminals OUT of the first- to m'th-stage unit circuits 30 are connected to the emission control lines E1 to Em, respectively.

Figure 5:
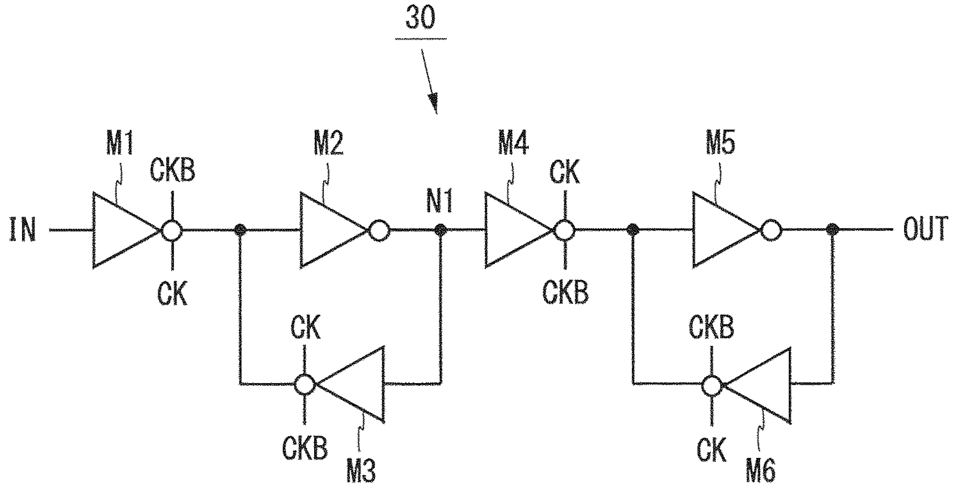
FIG. 5 is a circuit diagram of a unit circuit in the emission control line driver circuit shown in FIG. 4.

FIG. 5 is a circuit diagram of the unit circuit 30. The unit circuit 30 shown in FIG. 5 includes four clocked inverters M1, M3, M4, and M6 and two inverters M2 and M5. The clocked inverter M1 is connected at an input terminal to the input terminal IN of the unit circuit 30. The clocked inverters M1 and M3 are connected at output terminals to an input terminal of the inverter M2. The inverter M2 is connected at an output terminal to input terminals of the clocked inverters M3 and M4. The clocked inverters M4 and M6 are connected at output terminals to an input terminal of the inverter M5. The inverter M5 is connected at an output terminal to an input terminal of the clocked inverter M6 and the output terminal OUT of the unit circuit 30.

When the clock terminal CK receives a high-level input signal, the clocked inverters M1 and M6 function as inverters, and the clocked inverters M3 and M4 output a signal in a high impedance state. When the clock terminal CK receives a low-level input signal, the clocked inverters M3 and M4 function as inverters, and the clocked inverters M1 and M6 output a signal in a high impedance state.

Accordingly, in the unit circuit 30, when the input signal received at the clock terminal CK transitions from low to high level, an input signal received at the input terminal IN is retained in a node N1. Moreover, when the input signal received at the clock terminal CK transitions from high to low level, the signal being retained in the node N1 is outputted from the output terminal OUT.

Figure 6:
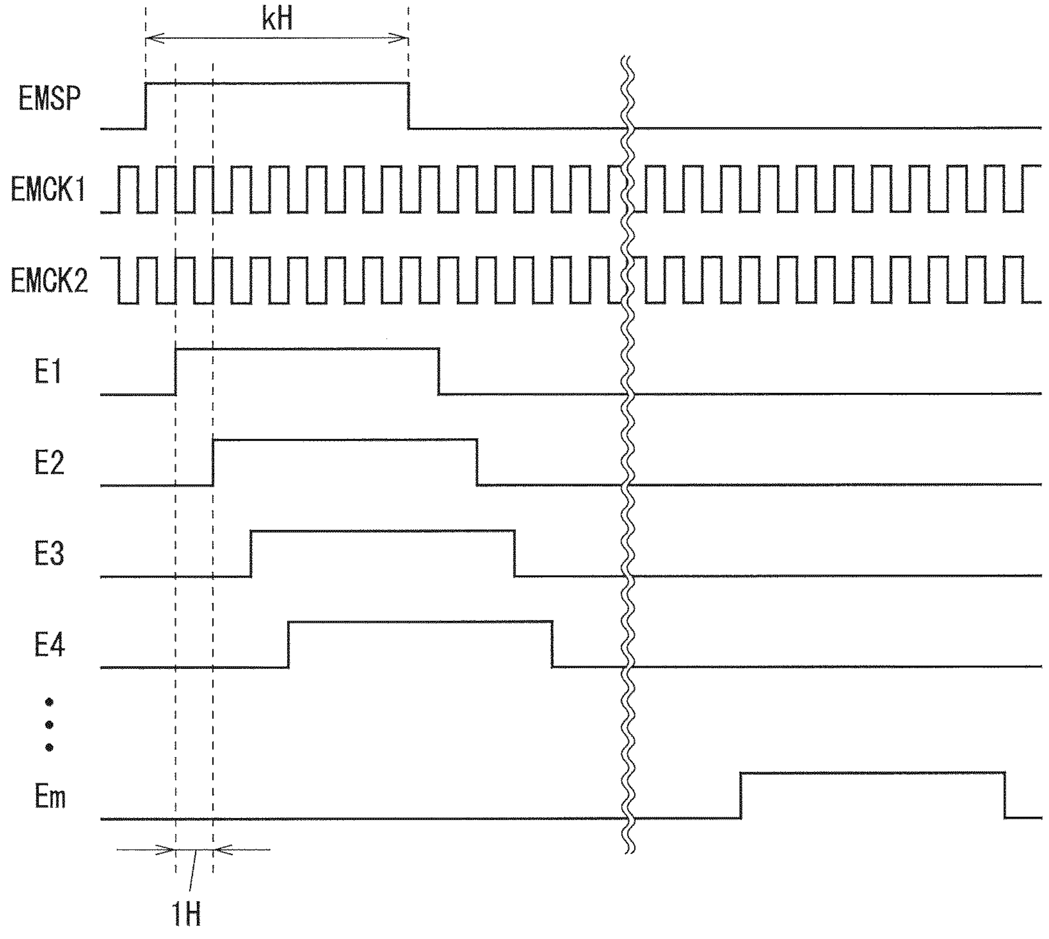
FIG. 6 is a timing chart for the emission control line driver circuit shown in FIG. 4.

FIG. 6 is a timing chart for the emission control line driver circuit 15. As shown in FIG. 6, the emission clock EMCK1 has a cycle of one horizontal period (1H). The emission start pulse EMSP is maintained at high level for the same duration as k horizontal periods (where k is an integer of 1 or more). The emission control line E1 experiences voltage changes which occur in the same pattern as changes of the emission start pulse EMSP with delays of less than one horizontal period after the changes of the emission start pulse EMSP. The emission control line E2 experiences voltage changes with delays of one horizontal period after the voltage changes of the emission control line E1. Similarly, the emission control line Ei experiences voltage changes with delays of one horizontal period after the emission control line Ei−1. Accordingly, the voltages on the emission control lines E1 to Em are sequentially raised to high level at intervals of one horizontal period within k horizontal periods.

The display device 10 has the function of changing the number of light emissions per frame period (also referred to below simply as "the number of light emissions"). In the case of a frame period for which the number of light emissions is N (where N is an integer of 1 or more), the display control circuit 12 sets N emission periods and N non-emission periods within the frame period, and outputs an emission start pulse EMSP as a control signal specifying the emission periods included in the frame period. The proportion of emission periods in the frame period will be referred to below as the "duty cycle". For example, in the case of a frame period having a duration Tf and including two non-emission periods, each having a duration Tx, the frame period has a duty cycle of (Tf−2Tx)/Tf. The organic EL element L1 emits light when the emission control line that corresponds thereto has a low-level voltage. Accordingly, the duty cycle can also be said to be the duration of a period with the emission control line having a low-level voltage expressed in percentage relative to the duration of one frame period. For example, when the emission control line has a constant low-level voltage during one frame period, the duty cycle is 100%.

Figure 7:
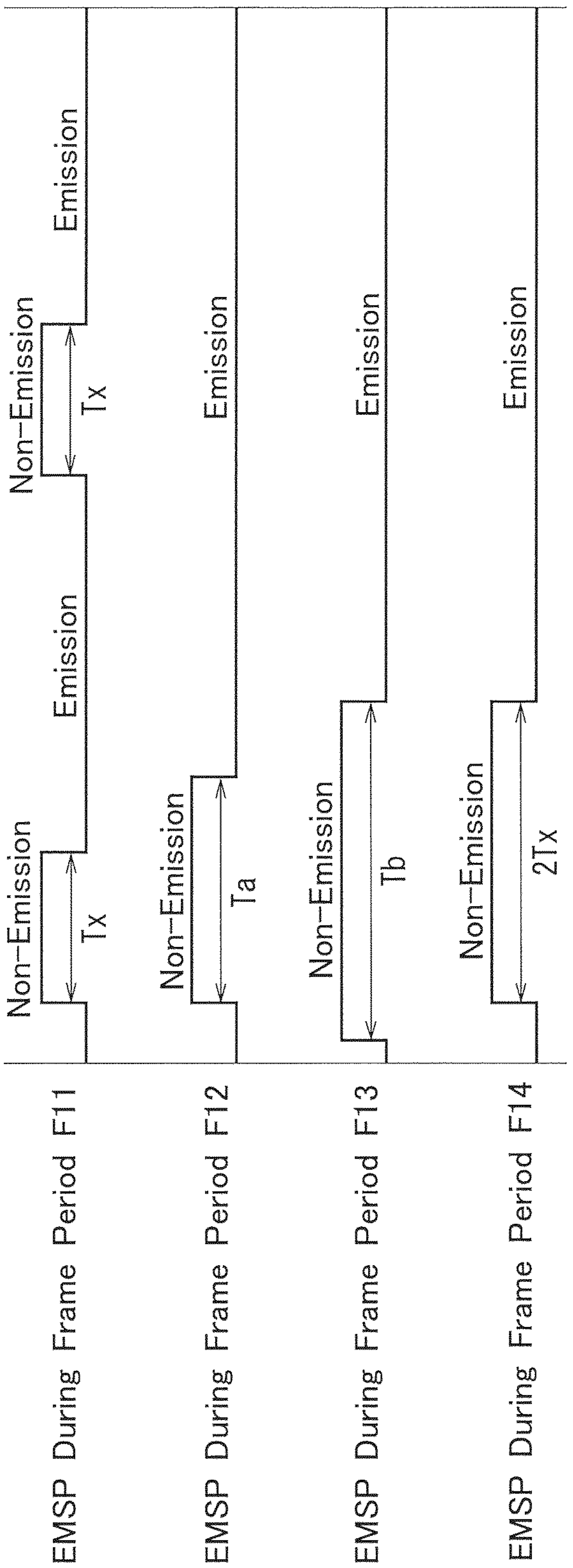
FIG. 7 is a diagram showing an emission start pulse for the display device shown in FIG. 1.
Figure 8:
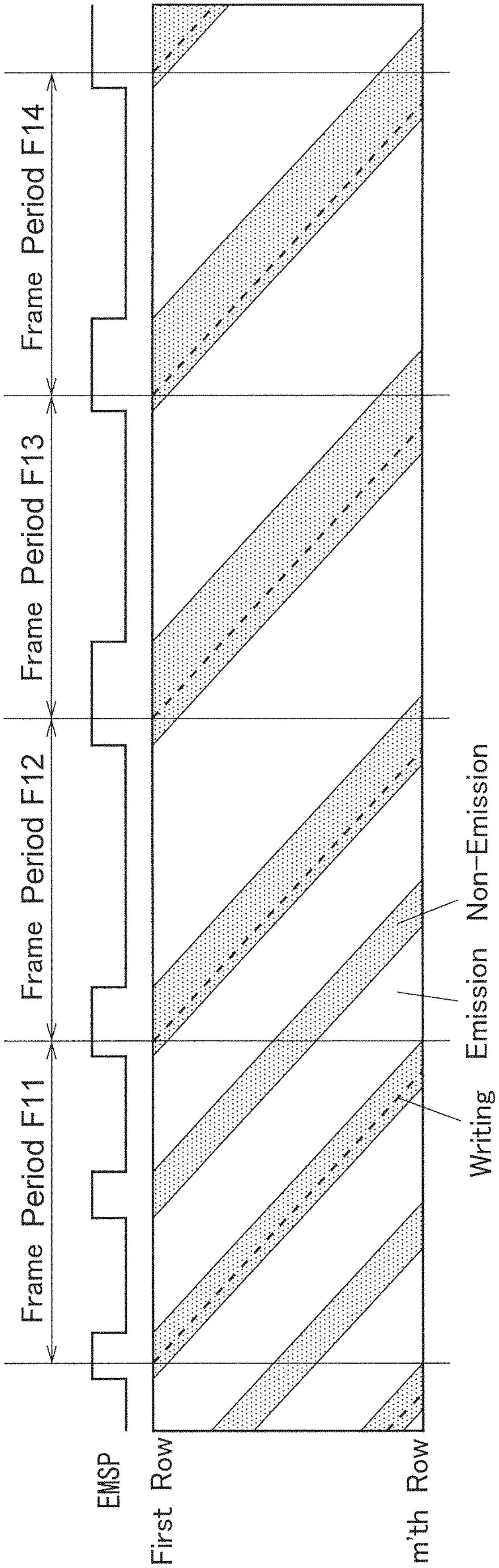
FIG. 8 is a diagram showing emission states for the display device shown in FIG. 1.
Figure 9:
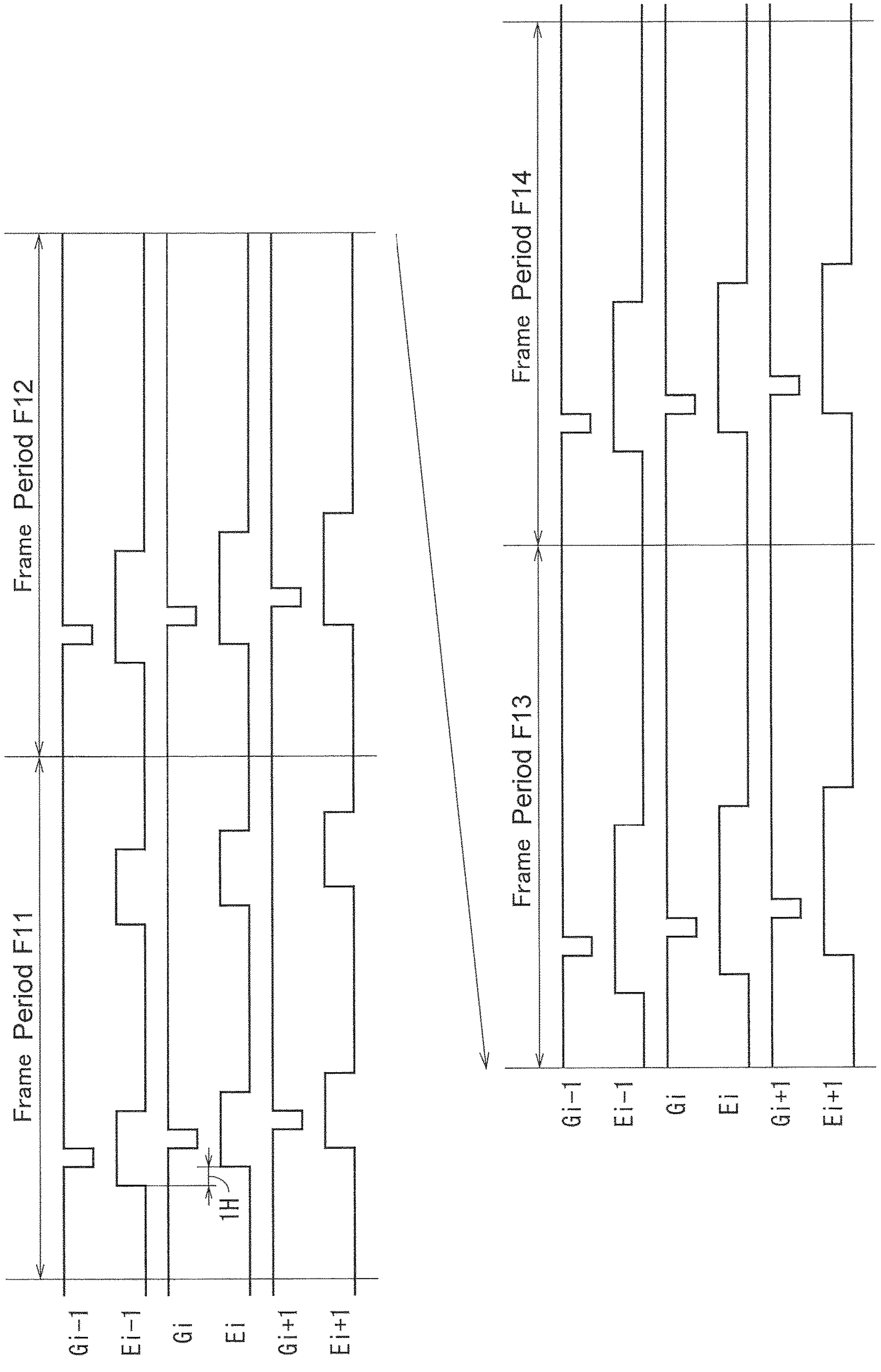
FIG. 9 is a timing chart for the display device shown in FIG. 1.

The display device 10 changes the number of light emissions from 1 to 2 or vice versa. FIG. 7 is a diagram showing the emission start pulse EMSP where the display device 10 changes the number of light emissions from 2 to 1. FIG. 8 is a timing chart showing emission states for the above case. FIG. 9 is a timing chart for the above case. In the figure showing the emission states, white parallelograms represent emission sections, dot pattern parallelograms represent non-emission sections, and broken lines represent positions where data voltages are written. In the timing chart, one horizontal period is shown at a larger scale than actual size for clarity.

FIG. 7 shows the emission start pulse EMSP during four consecutive frame periods F11 to F14. During the frame periods F11 to F14, the emission start pulse EMSP changes as shown in FIG. 8. The emission control lines E1 to Em sequentially experience respective voltage changes which occur in the same pattern as changes of the emission start pulse EMSP at intervals of one horizontal period therebetween (see FIG. 9). When the emission control line Ei has a low-level voltage, the organic EL element L1 in the i'th-row pixel circuit 20 emits light. When the emission control line Ei has a high-level voltage, the organic EL element L1 in the i'th-row pixel circuit 20 emits no light. The display portion 11 emits light during the emission sections shown in FIG. 8, and emits no light during other sections.

As shown in FIG. 7, the frame period F11 includes two emission periods and two non-emission periods, and each non-emission period has a duration Tx. The frame period F14 includes one emission period and one non-emission period with a duration 2Tx. The frame periods F11 and F14 include different numbers of emission periods but have the same duty cycle.

The frame periods F11 and F14 are intervened by the two frame periods F12 and F13. The frame period F12 includes one emission period and one non-emission period with a duration Ta. The frame period F13 includes one emission period and one non-emission period with a duration Tb. The durations Tx, Ta, and Tb have the relationship given by the following inequality (2):

$$Tx<Ta<2Tx<Tb \quad (2)$$

Accordingly, the frame period F12 has a higher duty cycle than the frame period F11. The frame period F13 has a lower duty cycle than the frame period F11. The frame periods F12 and F13 have different duty cycles.

The frame periods F11, F12, F13, and F14 are regarded as leading, first transition, second transition, and trailing frame periods, respectively. In the case where the leading frame period F11 and the trailing frame period F14 have the same proportion of emission periods but include different numbers of emission periods, the leading frame period F11 and the trailing frame period F14 are intervened by the first transition frame period F12 and the second transition frame period F13, which each have a different proportion of emission periods from the leading frame period F11.

The leading frame period F11 includes two emission periods, and the trailing frame period F14 includes one emission period. The first transition frame period F12 includes one emission period that differs in start time from those included in the leading frame period F11 and the trailing frame period F14. The second transition frame period F13 includes one emission period that differs in start time from those included in the leading frame period F11 and in end time from those included in the leading frame period F11 and the trailing frame period F14. The emission periods included in the first transition frame period F12 and the second transition frame period F13 are different from those included in both the leading frame period F11 and the trailing frame period F14. The first transition frame period F12 and the second transition frame period F13 include the same number of emission periods as the trailing frame period F14. The first transition frame period F12 and the second transition frame period F13 have different proportions of emission periods. The emission period included in the second transition frame period F13 differs in start and end times from that included in the first transition frame period F12.

The trailing frame period F14 includes fewer emission periods than the leading frame period F11. When compared to the leading frame period F11, the first transition frame period F12 includes fewer emission periods but has a higher proportion of emission periods. When compared to the first transition frame period F12, the second transition frame period F13 includes the same number of emission periods but has a lower proportion of emission periods. The trailing frame period F14 includes the same number of emission periods as the second transition frame period F13.

Figure 10:
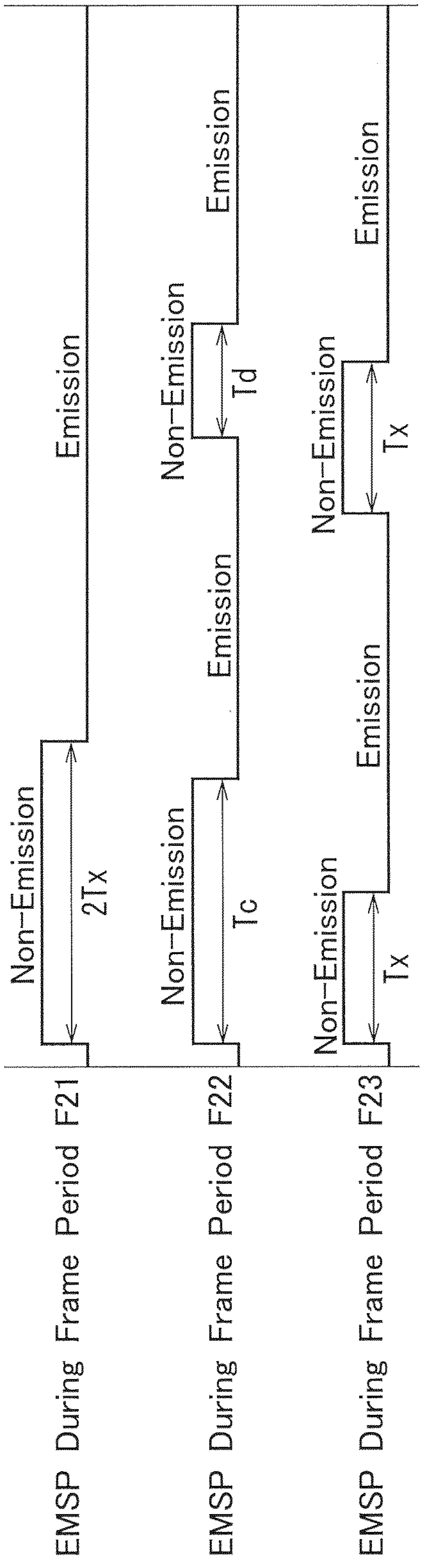
FIG. 10 is a diagram showing an emission start pulse for the display device shown in FIG. 1.
Figure 11:
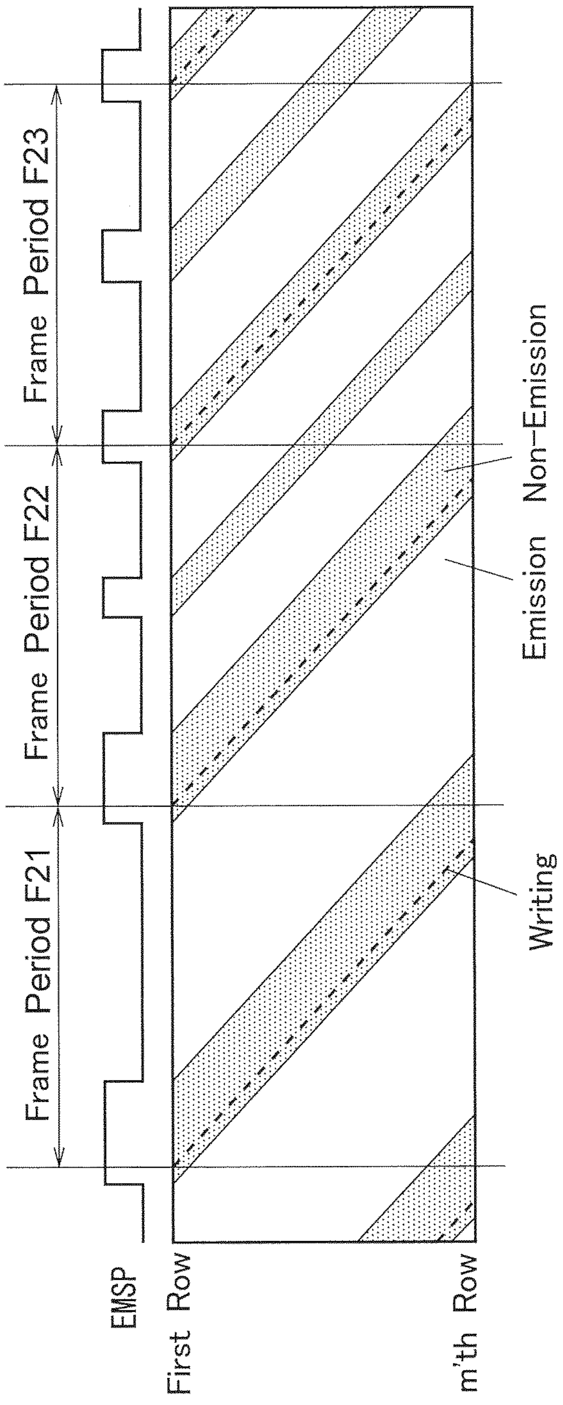
FIG. 11 is a diagram showing emission states for the display device shown in FIG. 1.
Figure 12:
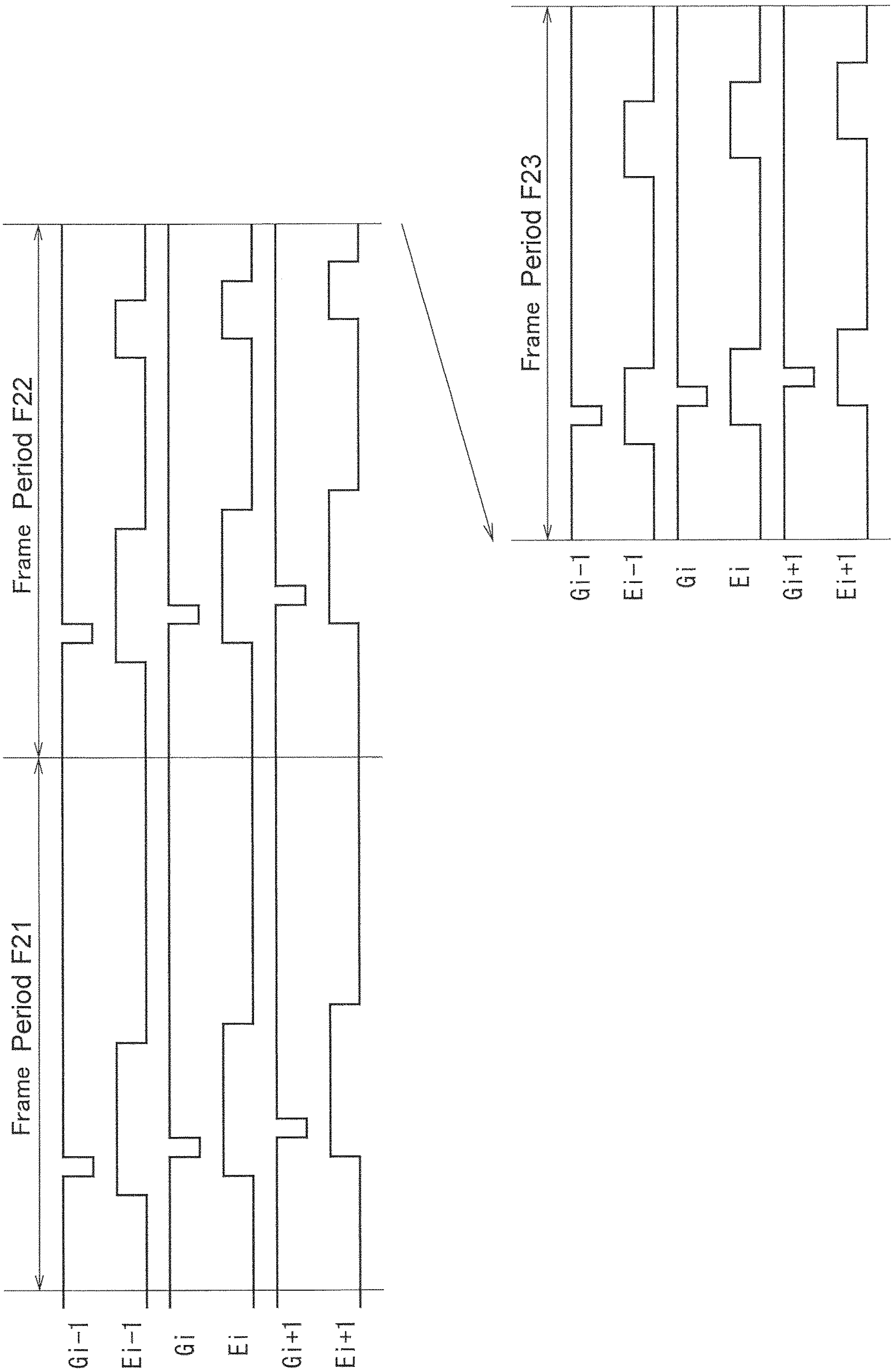
FIG. 12 is a timing chart for the display device shown in FIG. 1.

FIG. 10 is a diagram showing the emission start pulse EMSP where the display device 10 changes the number of light emissions from 1 to 2. FIG. 11 is a diagram showing emission states for the above case. FIG. 12 is a timing chart for the above case. The emission start pulse EMSP changes as shown in FIGS. 10 and 11 during frame periods F21 to F23. The display portion 11 emits light during emission sections shown in FIG. 11, and emits no light during other sections.

As shown in FIG. 10, the frame period F21 includes an emission period being set in the same manner as in the frame period F14, and the frame period F23 includes emission periods being set in the same manner as in the frame period F11. The frame periods F21 and F23 include different numbers of emission periods but have the same duty cycle.

The frame periods F21 and F23 are intervened by the frame period F22. The frame period F22 includes two emission periods, one non-emission period with a duration Tc, and one non-emission period with a duration Td. The durations Tx, Tc, and Td have the relationship given by the following inequality (3):

$$Td<Tx<Tc<2Tx<Tc+Td \quad (3)$$

Accordingly, the frame period F22 has a lower duty cycle than the frame period F21.

The frame periods F21, F22, and F23 are regarded as leading, transition, and trailing frame periods, respectively. In the case where the leading frame period F21 and the trailing frame period F23 have the same proportion of emission periods but include different numbers of emission periods, the leading frame period F21 and the trailing frame period F23 are intervened by the transition frame period F22 having a different proportion of emission periods from the leading frame period F21.

The leading frame period F21 includes one emission period. The trailing frame period F23 includes two emission periods. The transition frame period F22 includes one emission period that differs in start time from those included in the leading frame period F21 and the trailing frame period F23. The transition frame period F22 also includes one emission period that differs in both start and end times from those included in the trailing frame period F23.

The trailing frame period F23 includes more emission periods than the leading frame period F21. When compared to the leading frame period F21, the transition frame period F22 includes more emission periods but has a lower proportion of emission periods. When compared to the transition frame period F22, the trailing frame period F23 includes the same number of emission periods but has a higher proportion of emission periods.

Figure 13:
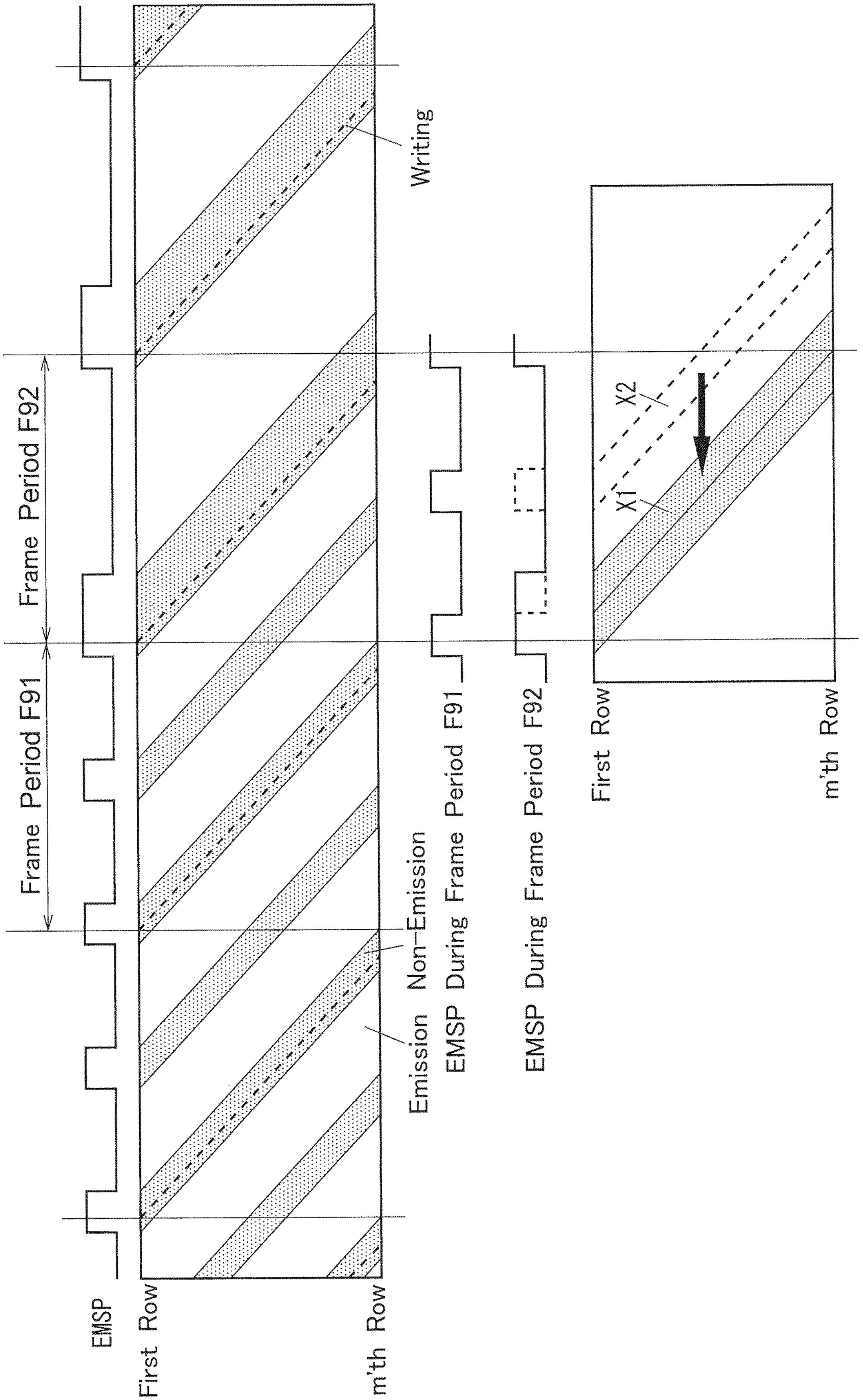
FIG. 13 is a diagram showing emission states for a display device according to a comparative example.

Described below is a display device according to a comparative example where there is no transition frame period between leading and trailing frame periods having the same proportion of emission periods but including different numbers of emission periods. FIG. 13 is a diagram showing emission states where the display device according to the comparative example changes the number of light emissions from 2 to 1. In FIG. 13, a frame period F91 includes two emission periods, and a frame period F92 includes one emission period. The frame periods F91 and F92 have the same duty cycle.

When the frame period F92 is compared to the frame period F91, the non-emission period in the frame period F92 is equivalent to the two non-emission periods in the frame period F91 combined by moving one of the two non-emission periods backwards in time (in FIG. 13, to the left). When the frame period F91 is followed by a similar frame period, the following frame period includes a non-emission section as shown by X2 in FIG. 13. On the other hand, when the frame period F91 is followed by the frame period F92, the frame period F92 includes a non-emission section as shown by X1 in FIG. 13. A part of the non-emission section occurs earlier in the latter case than in the former case, and therefore the observer sees a reduced luminance during the frame period F92 and the subsequent frame period (the luminance seen by the observer will be referred to below as the observed luminance).

In contrast to the above, when the display device according to the comparative example changes the number of light emissions from 1 to 2, the aforementioned part of the non-emission section occurs later, resulting in an increase in observed luminance during the frame period F92 and the subsequent frame period. The observer perceives such luminance changes as flickering. Therefore, in the display device according to the comparative example, display screen flickering occurs due to the changing of the number of light emissions per frame period.

On the other hand, in the case of the display device 10 according to the present embodiment, where the leading and trailing frame periods have the same proportion of emission periods but include different numbers of emission periods, the leading and trailing frame periods are intervened by one or two transition frame periods having a different proportion or proportions of emission periods from the leading frame period. The transition frame period may include an emission period that differs from those included in either the leading or trailing frame period or both in terms of either start or end time or both. The transition frame period may include the same number of emission periods as the trailing frame period.

In the case where the display device 10 changes the number of light emissions from 2 to 1, the first transition frame period F12 is set so as to have a higher proportion of emission periods and hence a higher duty cycle than the leading frame period F11, thereby properly increasing the observed luminance. Moreover, the second transition frame period F13 is set so as to have a lower proportion of emission periods and hence a lower duty cycle than the leading frame period F11 and the first transition frame period F12, thereby preventing an excessive increase in observed luminance due to the presence of the first transition frame period F12.

In the case where the display device 10 changes the number of light emissions from 1 to 2, the transition frame period F22 is set so as to have a lower proportion of emission periods and hence a lower duty cycle than the leading frame period F21, thereby properly decreasing the observed luminance.

Therefore, in the case of the display device 10 according to the present embodiment, where the number of light emissions per frame period is changed during a transition from the leading frame period to the trailing frame period, the leading and trailing frame periods are intervened by a transition frame period or periods having a different proportion or proportions of emission periods from the leading frame period. This renders it possible to properly change the observed luminance in the opposite direction to the change in the number of light emissions per frame period and thereby prevent flickering caused by the changing of the number of light emissions.

In the case of the display device according to the comparative example, the observed luminance decreases when the number of light emissions is lowered, and increases when the number of light emissions is raised. However, the direction and degree of such an observed luminance change resulting from changing the number of light emissions can vary depending on factors such as the position of the emission period within the frame period. For example, the observed luminance might increase when the member of light emissions is lowered, or might decrease when the number of light emissions is raised. Even in such a case, as in the cases described above, the occurrence of flickering caused by the changing of the number of light emissions per frame period can be prevented by setting the transition frame period or periods between the leading and trailing frame periods such that each transition frame period has a different proportion of emission periods from the leading frame period.

Second Embodiment

A display device according to a second embodiment has the same configuration as the display device 10 according to the first embodiment (FIG. 1) and changes the number of light emissions from 1 to 2 or vice versa. In the case where the number of light emissions is changed from 2 to 1, the display device according to the present embodiment uses the same emission start pulse EMSP as that used in the first embodiment (FIG. 7). In the case where the number of light emissions is changed from 1 to 2, the display device according to the present embodiment uses an emission start pulse EMSP different from that used in the first embodiment.

Figure 14:
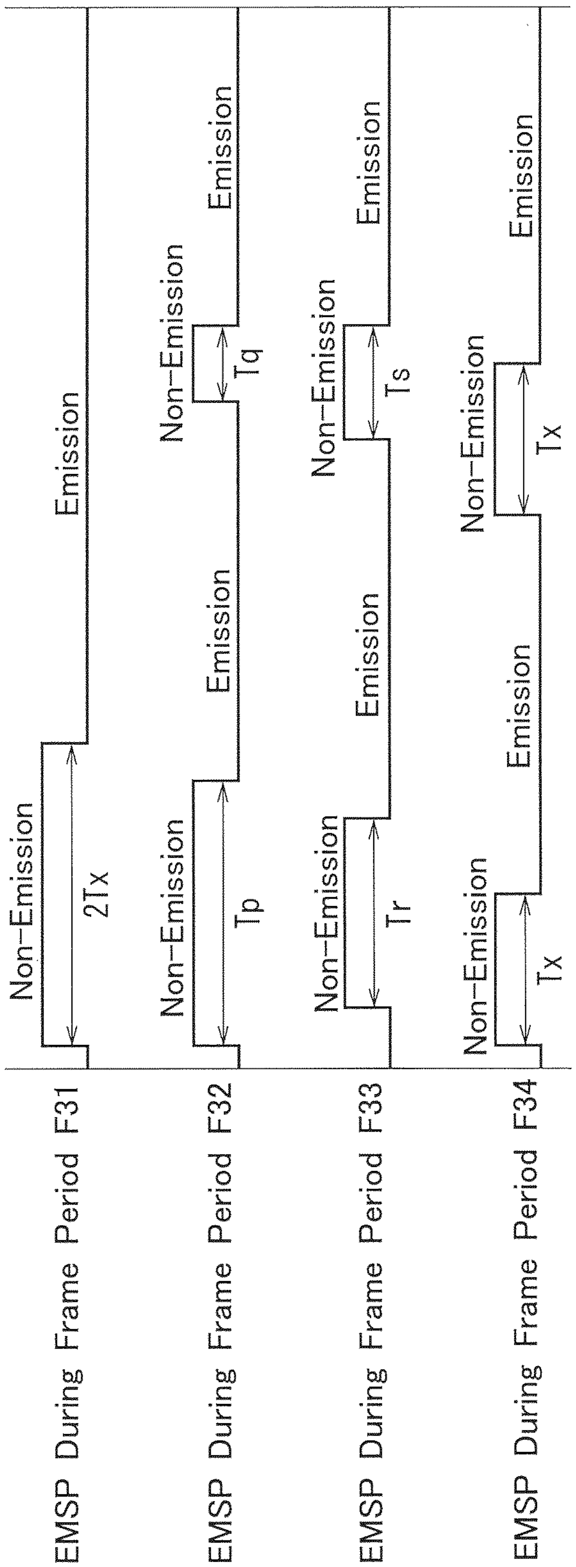
FIG. 14 is a diagram showing an emission start pulse for a display device according to a second embodiment.
Figure 15:
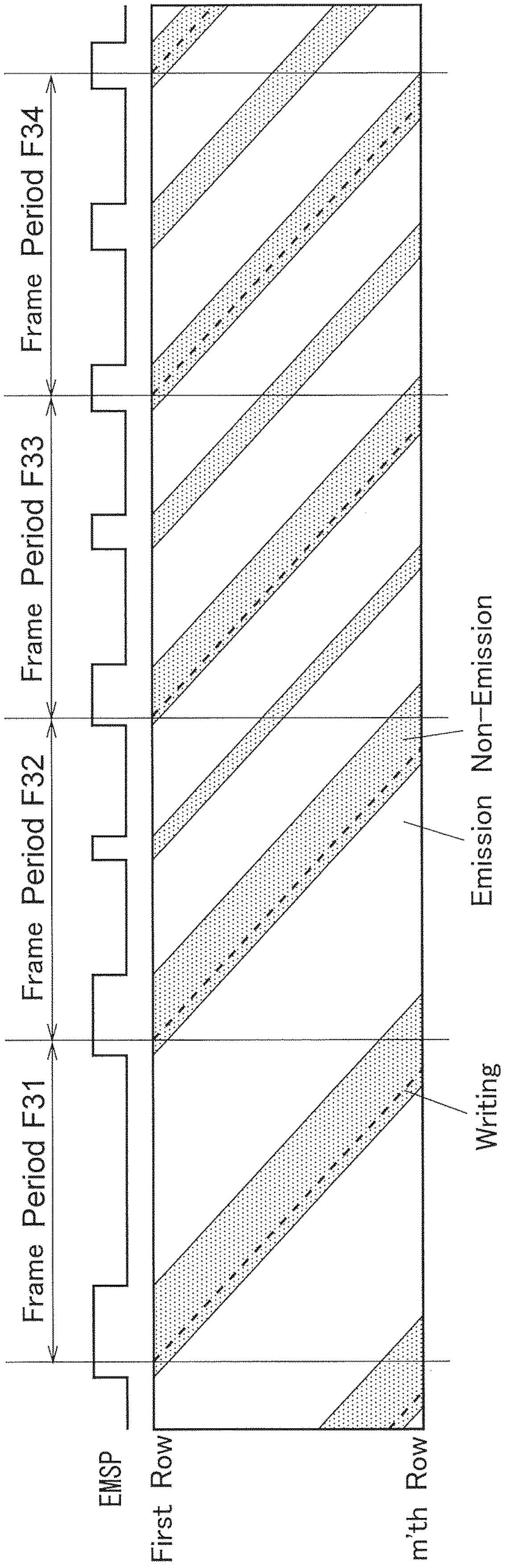
FIG. 15 is a diagram showing emission states for the display device according to the second embodiment.
Figure 16:
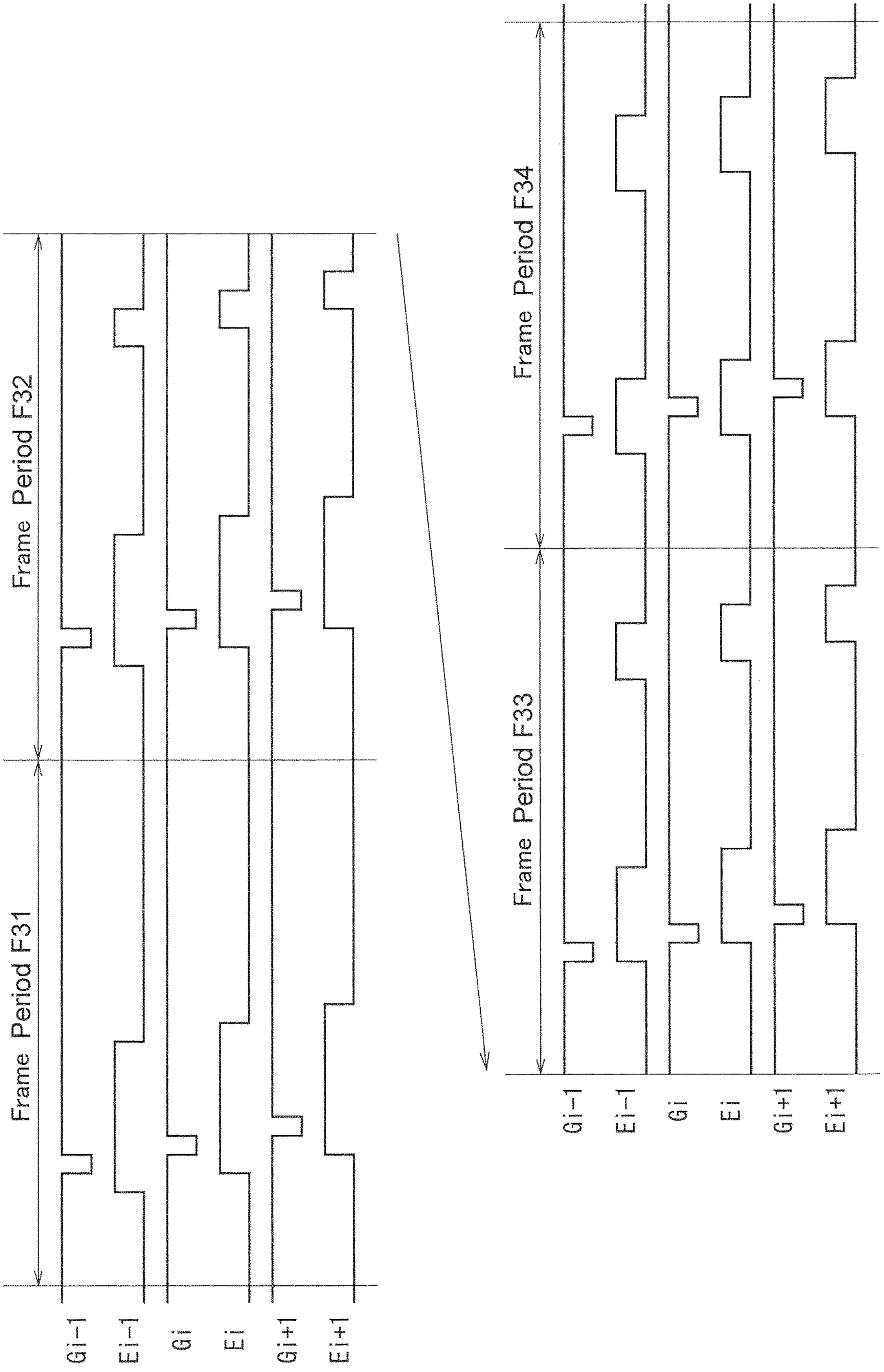
FIG. 16 is a timing chart for the display device according to the second embodiment.

FIG. 14 is a diagram showing the emission start pulse EMSP where the display device according to the present embodiment changes the number of light emissions from 1 to 2. FIG. 15 is a diagram showing emission states for the above case. FIG. 16 is a timing chart for the above case. The emission start pulse EMSP changes as shown in FIGS. 14 and 15 during frame periods F31 to F34. The display portion 11 emits light during emission sections shown in FIG. 15, and emits no light during other sections.

As shown in FIG. 14, the frame period F31 includes an emission period being set in the same manner as in the frame period F14, and the frame period F34 includes emission periods being set in the same manner as in the frame period F11. The frame periods F31 and F34 include different numbers of emission periods but have the same duty cycle.

The frame periods F31 and F34 are intervened by the two frame periods F32 and F33. The frame period F32 includes two emission periods, one non-emission period with a duration Tp, and one non-emission period with a duration Tq. The frame period F33 includes two emission periods, one non-emission period with a duration Tr, and one non-emission period with a duration Ts. The durations Tx, Tp, Tq, Tr, and Ts have the relationship given by the following inequalities (4) and (5):

$$Tq<Ts<Tx<Tr<Tp<2Tx \tag{4}$$

$$Tr+Ts<2Tx<Tp+Tq \tag{5}$$

Accordingly, the frame period F32 has a lower duty cycle than the frame period F31. The frame period F33 has a higher duty cycle than the frame period F31. The frame periods F32 and F33 have different duty cycles.

The frame periods F31, F32, F33, and F34 are regarded as leading, first transition, second transition, and trailing frame periods, respectively. In the case where the leading frame period F31 and the trailing frame period F34 have the same proportion of emission periods but include different numbers of emission periods, the leading frame period F31 and the trailing frame period F34 are intervened by the first transition frame period F32 and the second transition frame period F33, both of which are different from the leading frame period F31 in terms of the proportion of emission periods. The first transition frame period F32 and the second transition frame period F33 have different proportions of emission periods. The emission periods included in the second transition frame period F33 differ from those included in the first transition frame period F32 in terms of either start or end time or both.

The leading frame period F31 includes one emission period, and the trailing frame period F34 includes two emission periods. One of the two emission periods included in the first transition frame period F32 differs in start time from those included in the leading frame period F31 and the trailing frame period F34, and the other differs in start and end times from those included in the trailing frame period F34. One of the two emission periods included in the second transition frame period F33 differs in start time from those included in the leading frame period F31 and the trailing frame period F34, and the other differs in start and end times from those included in the trailing frame period F34. Accordingly, the emission periods included in the first transition frame period F32 and the second transition frame period F33 are different from those included in both the leading frame period F31 and the trailing frame period F34. The first transition frame period F32 and the second transition frame period F33 include the same number of emission periods as the trailing frame period F34. The first transition frame period F32 and the second transition frame period F33 have different proportion of emission periods. The emission periods included in the first transition frame period F32 and the second transition frame period F33 are different in terms of both start and end times.

The trailing frame period F34 includes more emission periods than the leading frame period F31. When compared to the leading frame period F31, the first transition frame period F32 includes more emission periods but has a lower proportion of emission periods. When compared to the first transition frame period F32, the second transition frame period F33 includes the same number of emission periods but has a higher proportion of emission periods. The trailing frame period F34 includes the same number of emission periods as the second transition frame period F33.

In the case where the display device according to the present embodiment changes the number of light emissions from 1 to 2, the first transition frame period F32 is set so as to have a lower proportion of emission periods and hence a lower duty cycle than the leading frame period F31, thereby properly decreasing the observed luminance. Moreover, the second transition frame period F33 is set so as to have a higher proportion of emission periods and hence a higher duty cycle than the leading frame period F31, thereby preventing an excessive decrease in observed luminance due to the presence of the first transition frame period F32.

In the case of the display device according to the present embodiment, as with the display device according to the first embodiment, where the number of light emissions per frame period is changed during a transition from the leading frame period to the trailing frame period, the leading and trailing frame periods are intervened by a transition frame period or periods having a different proportion or proportions of emission periods from the leading frame period. This renders it possible to properly change the observed luminance in the opposite direction to the change in the number of light emissions per frame period and thereby prevent flickering caused by the changing of the number of light emissions.

Third Embodiment

A display device according to a third embodiment has the same configuration as the display device 10 according to the first embodiment (FIG. 1) and changes the number of light emissions simultaneously with a change in frame rate. The display device according to the present embodiment switches between first and second operation modes. In the first operation mode, the display device according to the present embodiment operates in normal drive at a frame rate of 90 Hz with the number of light emissions being 1. In the second operation mode, the display device according to the present embodiment operates in pause drive at a frame rate of 60 Hz with the number of light emissions being 3. Note that the term pause drive refers to a drive method in which one frame period is divided into scanning and pause periods, and data voltage writing is stopped during the pause period.

Figure 17:
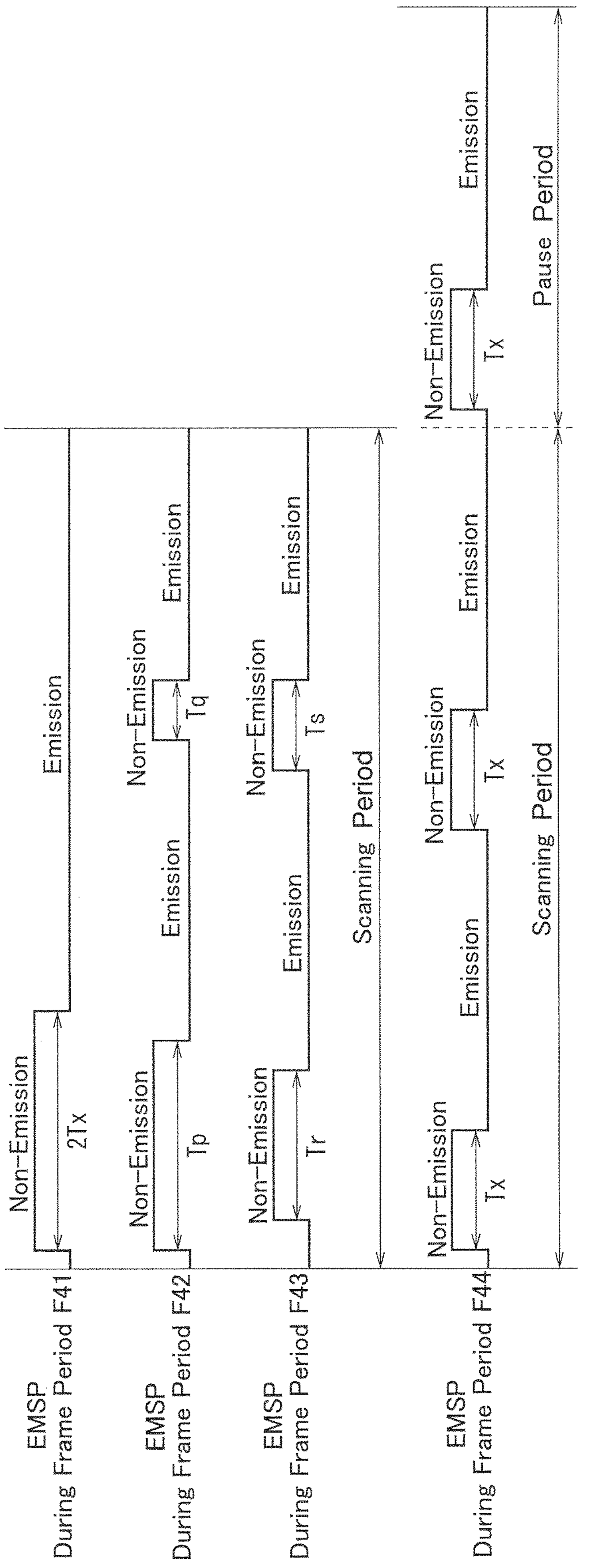
FIG. 17 is a diagram showing an emission start pulse for a display device according to a third embodiment.
Figure 18:
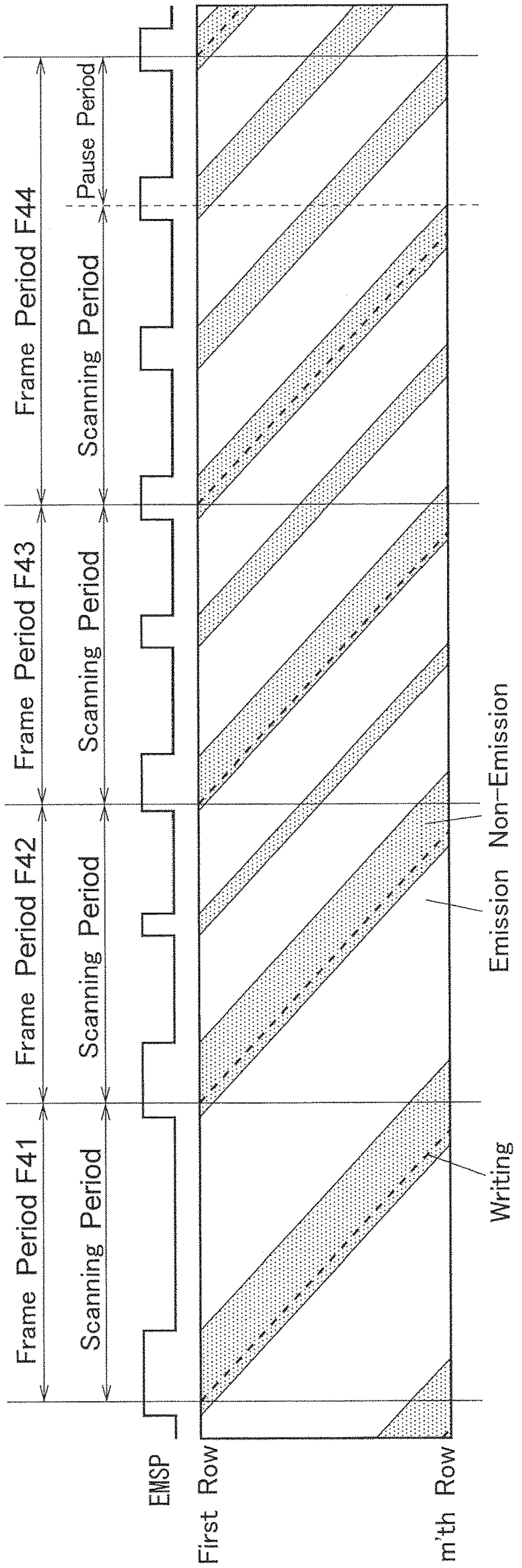
FIG. 18 is a diagram showing emission states for the display device according to the third embodiment.
Figure 19:
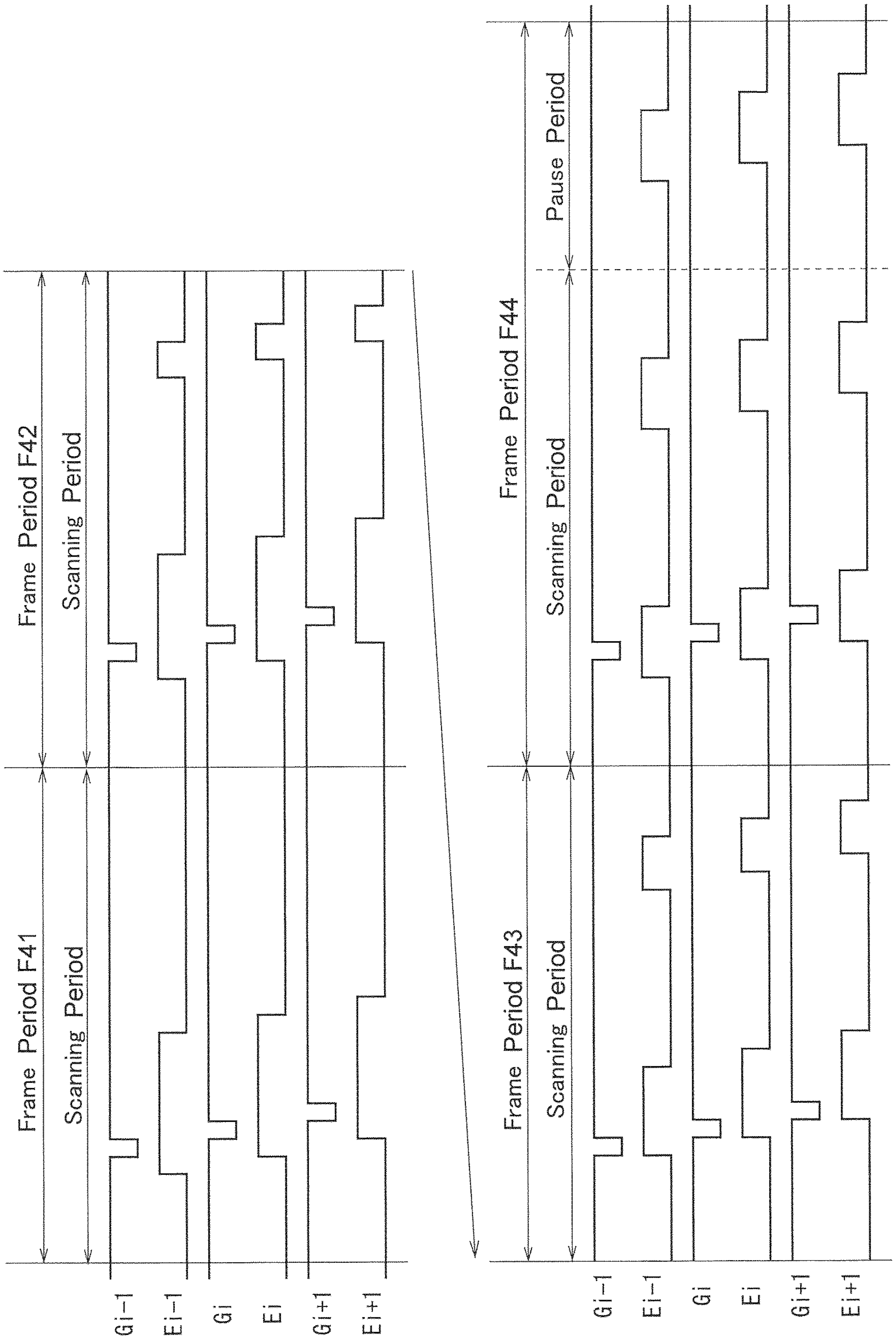
FIG. 19 is a timing chart for the display device according to the third embodiment.

FIG. 17 is a diagram showing the emission start pulse EMSP where the display device according to the present embodiment switches from the first to the second operation mode. FIG. 18 is a diagram showing emission states for the above case. FIG. 19 is a timing chart for the above case. The emission start pulse EMSP changes as shown in FIGS. 17 and 18 during frame periods F41 to F44. The display portion 11 emits light during emission sections shown in FIG. 18, and emits no light during other sections.

As shown in FIG. 17, the frame period F41 includes an emission period being set in the same manner as in the frame period F14. The frame period F44 is 1.5 times as long as the frame period F41. The frame period F44 consists of a scanning period and a pause period. The scanning period lasts for the first two-thirds of the frame period F44, and the pause period lasts for the rest of the frame period F44. The frame period F44 includes three emission periods and three non-emission periods, and each non-emission period has a duration Tx. The frame periods F41 and F44 are intervened by the two frame periods F42 and F43. The frame period F42 includes emission periods being set in the same manner as in the frame period F32. The frame period F43 includes emission periods being set in the same manner as in the frame period F33.

The frame periods F41, F42, F43, and F44 are regarded as leading, first transition, second transition, and trailing frame periods, respectively. The leading frame period F41, the first transition frame period F42, and the second transition frame period F43 are normal frame periods, each consisting solely of a scanning period. The trailing frame period F44 is a compound frame period consisting of a scanning period and a pause period. The scanning period of the trailing frame period F44 being set as a compound frame period has the same proportion of emission periods as the leading frame period F41. The scanning period includes the same number of emission periods as the first transition frame period F42 and the second transition frame period F43.

Figure 20:
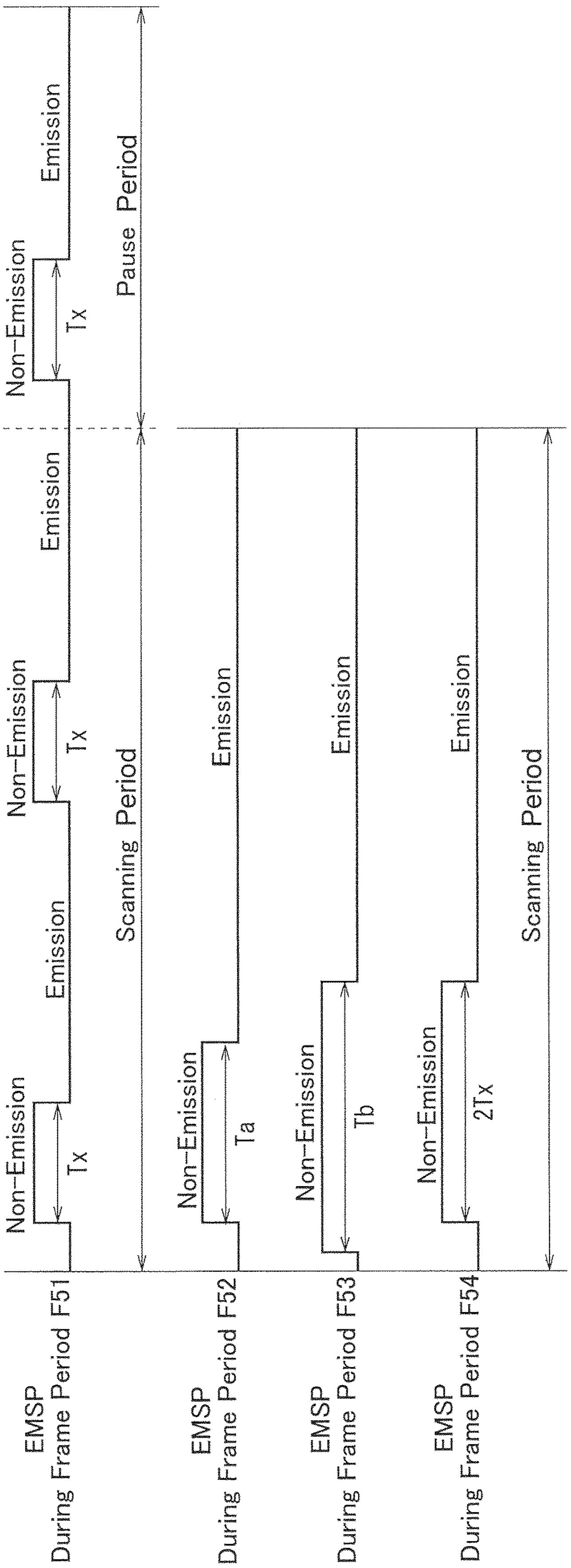
FIG. 20 is another diagram showing an emission start pulse for the display device according to the third embodiment.
Figure 21:
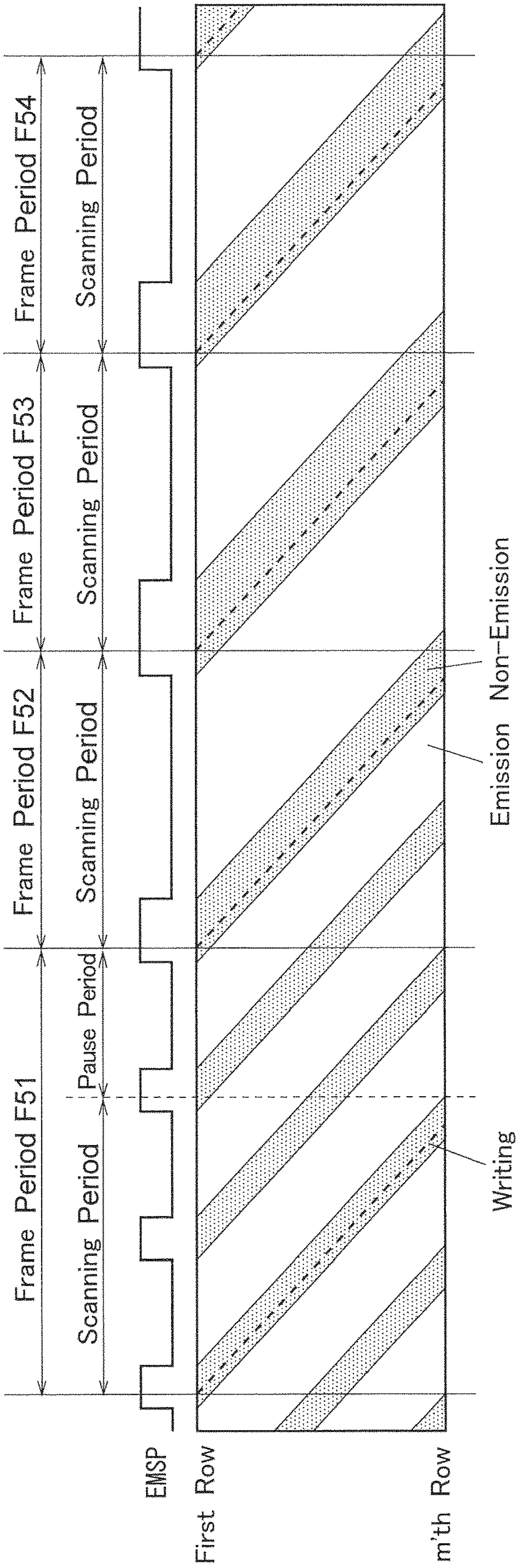
FIG. 21 is another diagram showing emission states for the display device according to the third embodiment.
Figure 22:
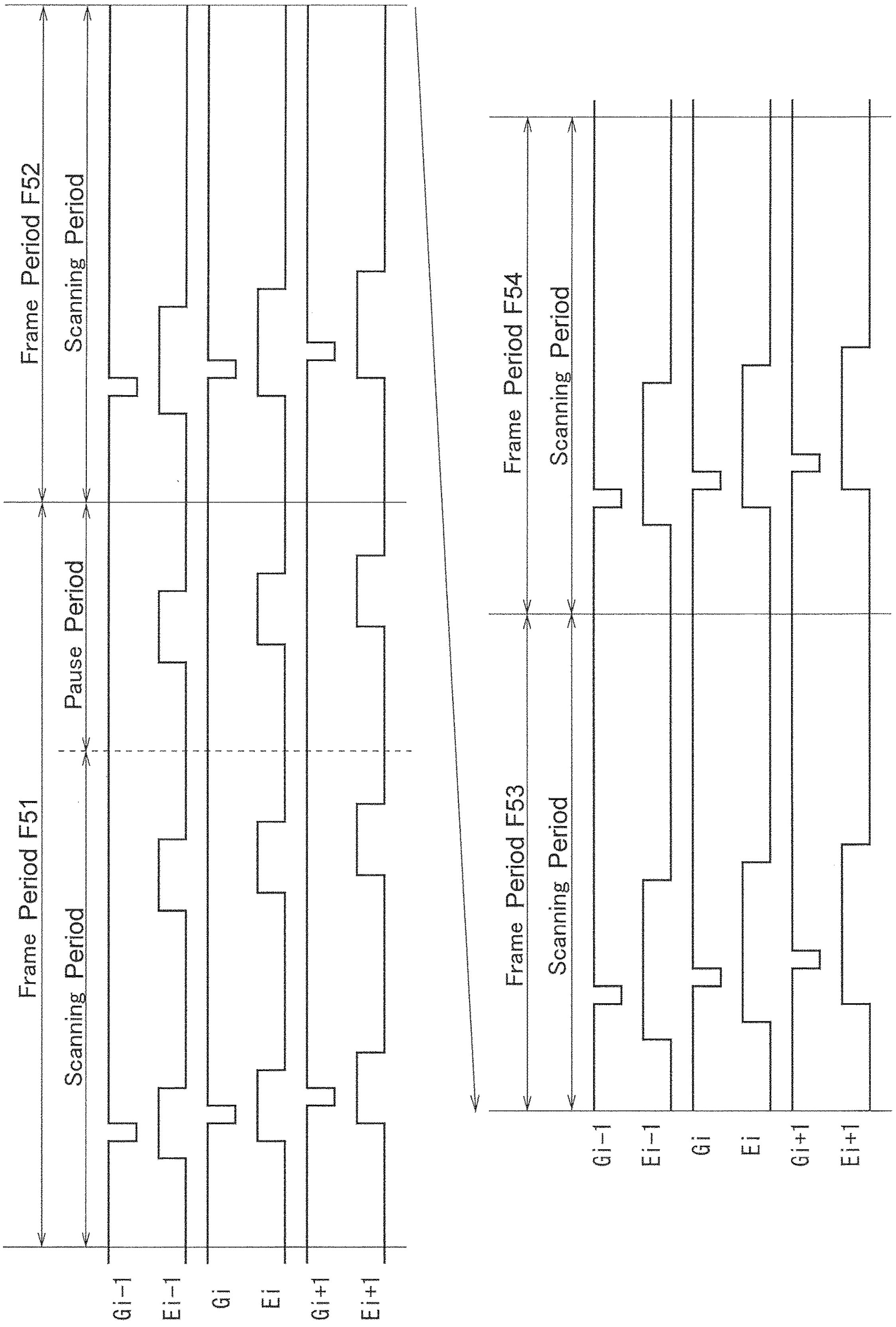
FIG. 22 is another timing chart for the display device according to the third embodiment.

FIG. 20 is a diagram showing the emission start pulse EMSP where the display device according to the present embodiment switches from the second to the first operation mode. FIG. 21 is a diagram showing emission states for the above case. FIG. 22 is a timing chart for the above case. The emission start pulse EMSP changes as shown in FIGS. 20 and 21 during frame periods F51 to F54. The display portion 11 emits light during emission sections shown in FIG. 21, and emits no light during other sections.

As shown in FIG. 20, the frame period F54 includes an emission period being set in the same manner as in the frame period F14. The frame period F51 is 1.5 times as long as the frame period F54. The frame period F51 consists of a scanning period and a pause period. The scanning period lasts for the first two-thirds of the frame period F51, and the pause period lasts for the rest of the frame period F51. The frame period F51 includes emission periods being set in the same manner as in the frame period F44. The frame periods F51 and F54 are intervened by the two frame periods F52 and F53. The frame period F52 includes an emission period being set in the same manner as in the frame period F12. The frame period F53 includes an emission period being set in the same manner as in the frame period F13.

The frame periods F51, F52, F53, and F54 are regarded as leading, first transition, second transition, and trailing frame periods, respectively. The leading frame period F51 is a compound frame period. The first transition frame period F52, the second transition frame period F53, and the trailing frame period F54 are normal frame periods. The scanning period of the leading frame period F51 being set as a compound frame period has the same proportion of emission periods as the trailing frame period F54. The scanning period includes more emission periods than the first transition frame period F52 and the second transition frame period F53.

Display devices that switch between the first and second operation modes use the first operation mode for video display and the second operation mode for still image display, thereby achieving enhanced display performance upon video display and reduced power consumption upon still image display. However, in the case where switching between the operation modes occurs during a transition from the leading frame period to the trailing frame period, the trailing frame period cannot be set so as to include a proper non-emission period if the trailing frame period immediately follows the leading frame period, with the result that display screen flickering occurs upon the switching between the operation modes.

On the other hand, in the case of the display device according to the present embodiment, where switching between the operation modes occurs during a transition from the leading frame period to the trailing frame period, the leading and trailing frame periods are intervened by two transition frame periods that differ from the leading frame period in terms of the proportion of emission periods. Accordingly, by employing such transition frame periods different from the leading frame period in terms of the proportion of emission periods, it is rendered possible to set a proper non-emission period within the trailing frame period and thereby prevent flickering caused by the switching between the operation modes.

Fourth Embodiment

A display device according to a fourth embodiment has the same configuration as the display device 10 according to the first embodiment (FIG. 1) and switches between the first and second operation modes. In the case of switching from the second to the first operation mode, the display device according to the present embodiment uses the same emission start pulse EMSP as that used in the third embodiment (FIG. 20). In the case of switching from the first to the second operation mode, the display device according to the present embodiment uses an emission start pulse EMSP different from that used in the third embodiment.

Figure 23:
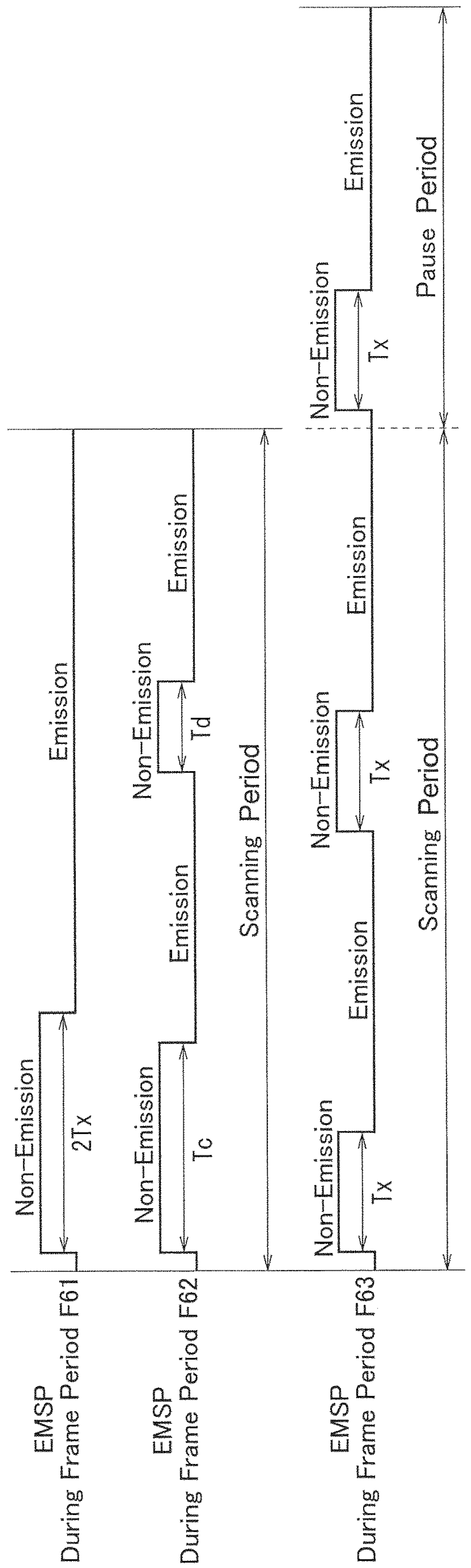
FIG. 23 is a diagram showing an emission start pulse for a display device according to a fourth embodiment.
Figure 24:
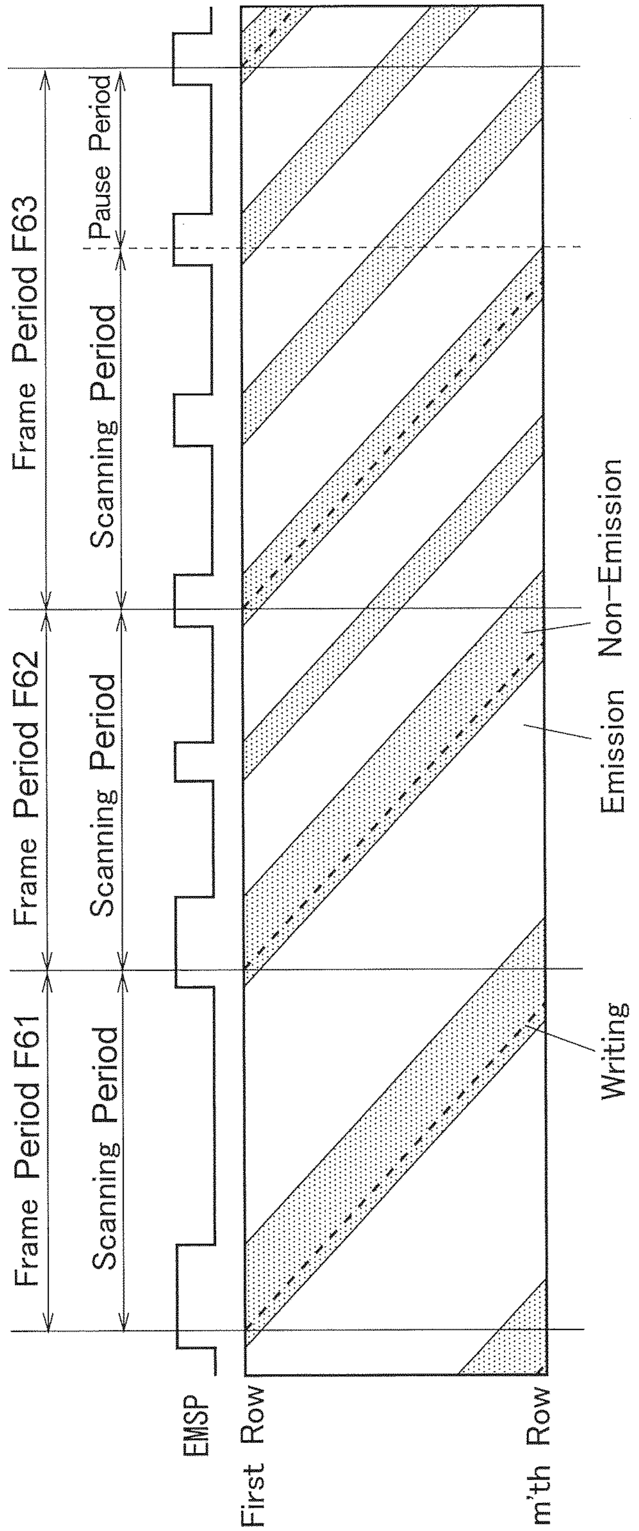
FIG. 24 is a diagram showing emission states for the display device according to the fourth embodiment.
Figure 25:
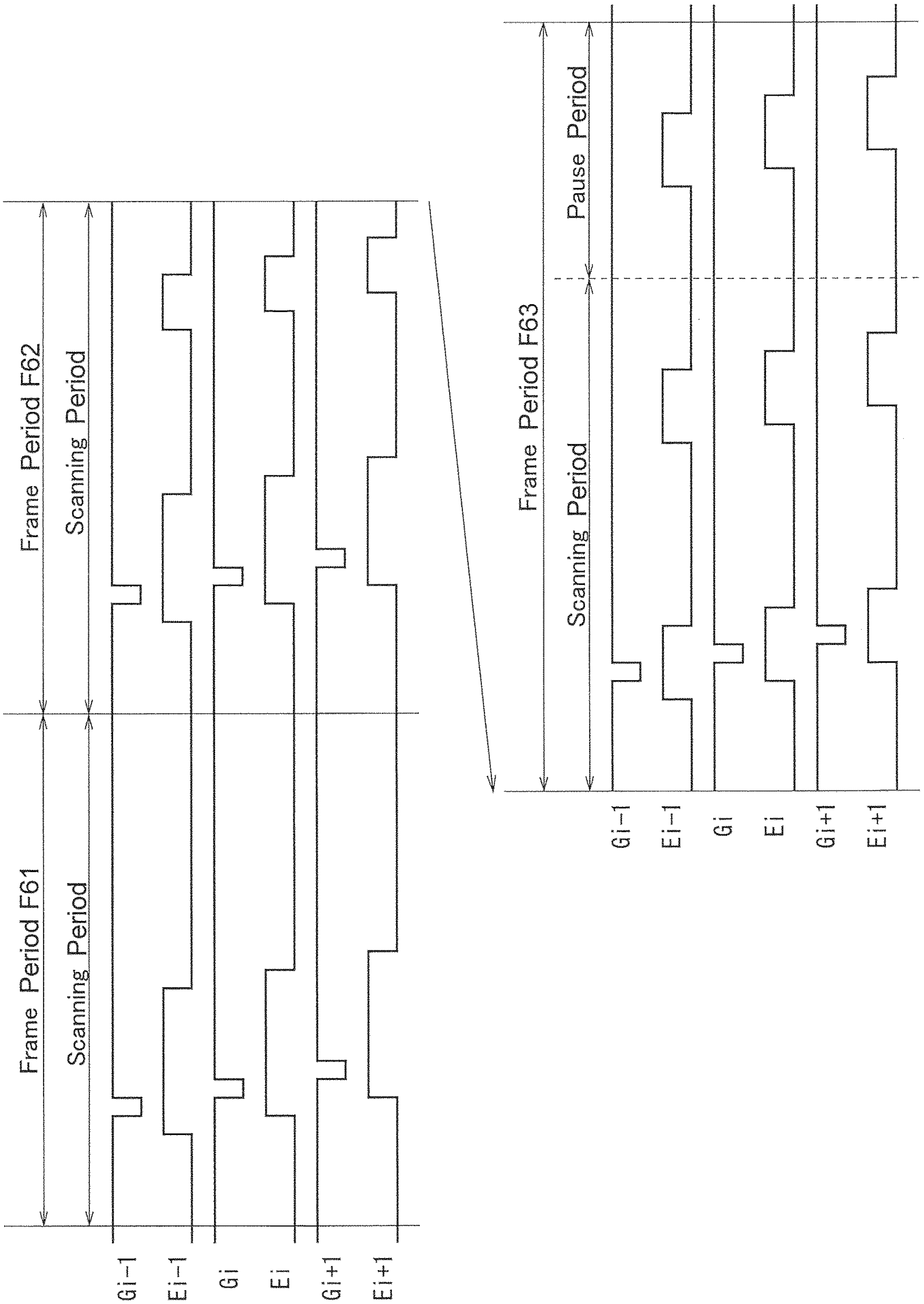
FIG. 25 is a timing chart for the display device according to the fourth embodiment.

FIG. 23 is a diagram showing the emission start pulse EMSP where the display device according to the present embodiment switches from the first to the second operation mode. FIG. 24 is a diagram showing emission states for the above case. FIG. 25 is a timing chart for the above case. The emission start pulse EMSP changes as shown in FIGS. 23 and 24 during frame periods F61 to F63. The display portion 11 emits light during emission sections shown in FIG. 24, and emits no light during other sections.

As shown in FIG. 23, the frame period F61 includes an emission period being set in the same manner as in the frame period F14. The frame period F63 is 1.5 times as long as the frame period F61. The frame period F63 consists of a scanning period and a pause period. The scanning period lasts for the first two-thirds of the frame period F63, and the pause period lasts for the rest of the frame period F63. The frame period F63 includes emission periods being set in the same manner as in the frame period F44. The frame periods F61 and F63 are intervened by the frame period F62. The frame period F62 includes emission periods being set in the same manner as in the frame period F22.

The frame periods F61, F62, and F63 are regarded as leading, transition, and trailing frame periods, respectively. The leading frame period F61 and the transition frame period F62 are normal frame periods. The trailing frame period F63 is a compound frame period. The scanning period of the trailing frame period F63 being set as a compound frame period has the same proportion of emission periods as the leading frame period F61. The scanning period has the same number of emission periods as the transition frame period F62.

In the case of the display device according to the present embodiment, as with the display device according to the third embodiment, where switching between the operation modes occurs during a transition from the leading frame period to the trailing frame period, the leading frame period and the trailing frame period are intervened by one or two transition frame periods having a different proportion or portions of emission periods from the leading frame period. Accordingly, by employing such a transition frame period or periods different from the leading frame period in terms of the proportion of emission periods, it is rendered possible to set a proper non-emission period within the trailing frame period and thereby prevent flickering caused by the switching between the operation modes.

Fifth Embodiment

A display device according to a fifth embodiment has the same configuration as the display device 10 according to the first embodiment (FIG. 1) and changes the number of light emissions simultaneously with a change in frame rate. The display device according to the present embodiment switches between third and fourth operation modes. In the third operation mode, the display device according to the present embodiment operates in normal drive at a frame rate of 120 Hz with the number of light emissions being 1. In the fourth operation mode, the display device according to the present embodiment operates in pause drive at a frame rate of 60 Hz with the number of light emissions being 4.

Figure 26:
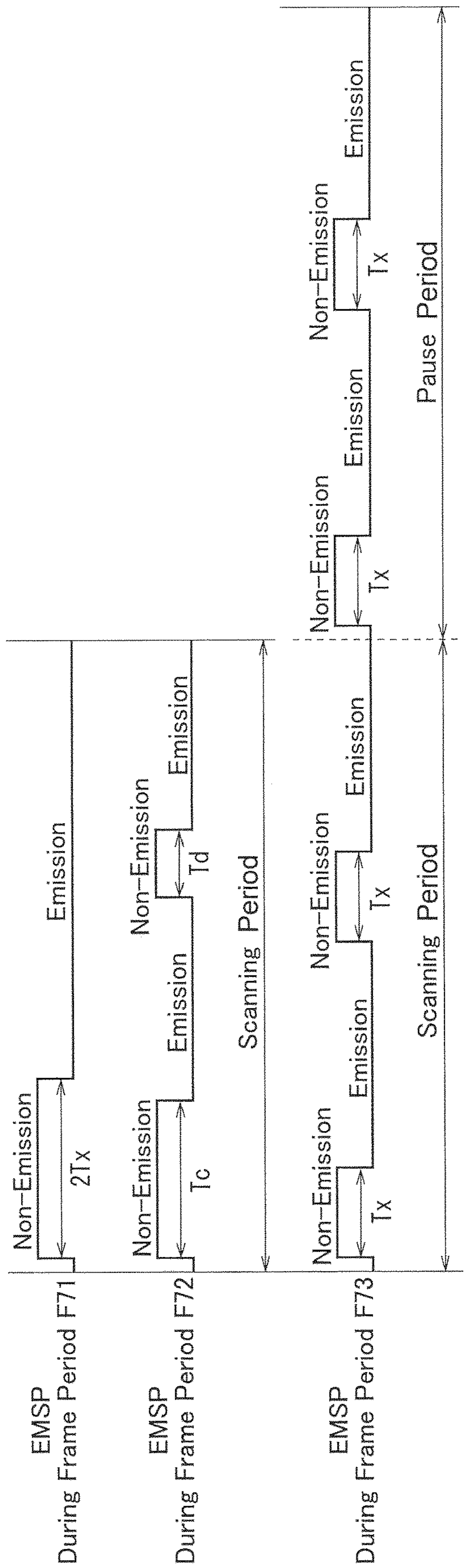
FIG. 26 is a diagram showing an emission start pulse for a display device according to a fifth embodiment.
Figure 27:
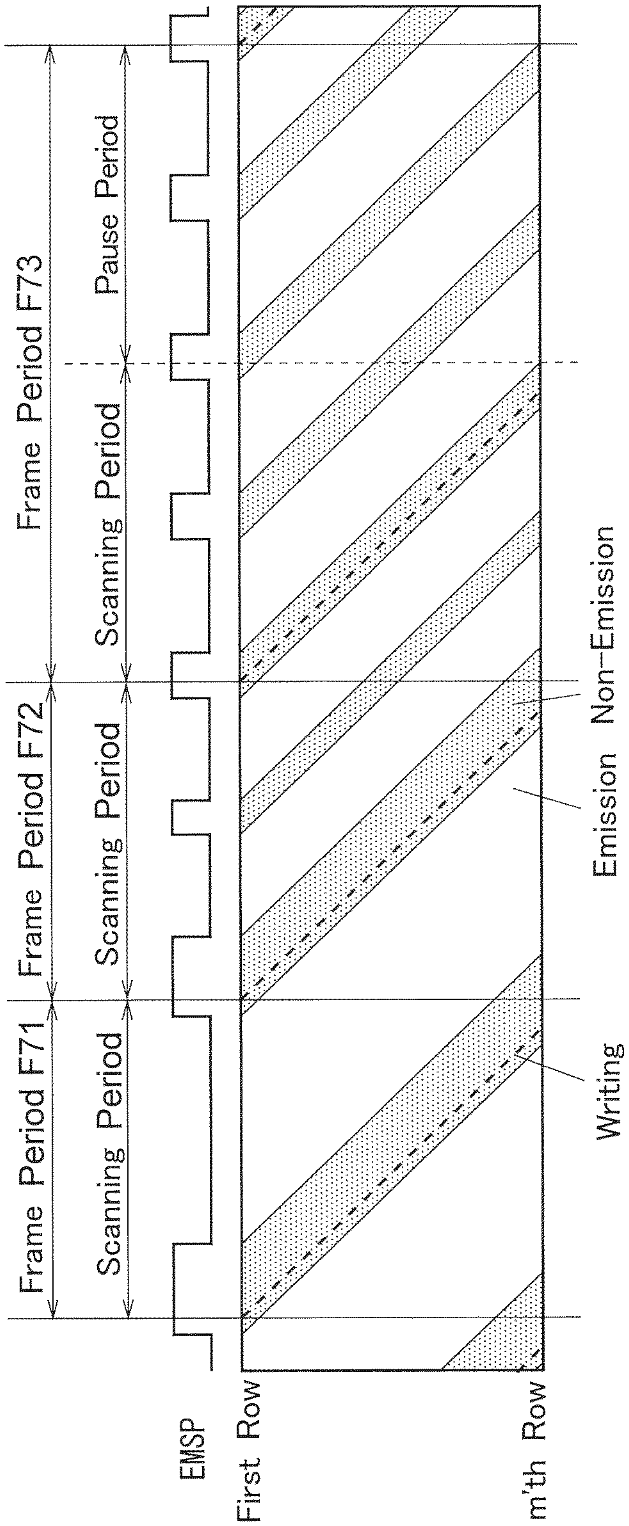
FIG. 27 is a diagram showing emission states for the display device according to the fifth embodiment.
Figure 28:
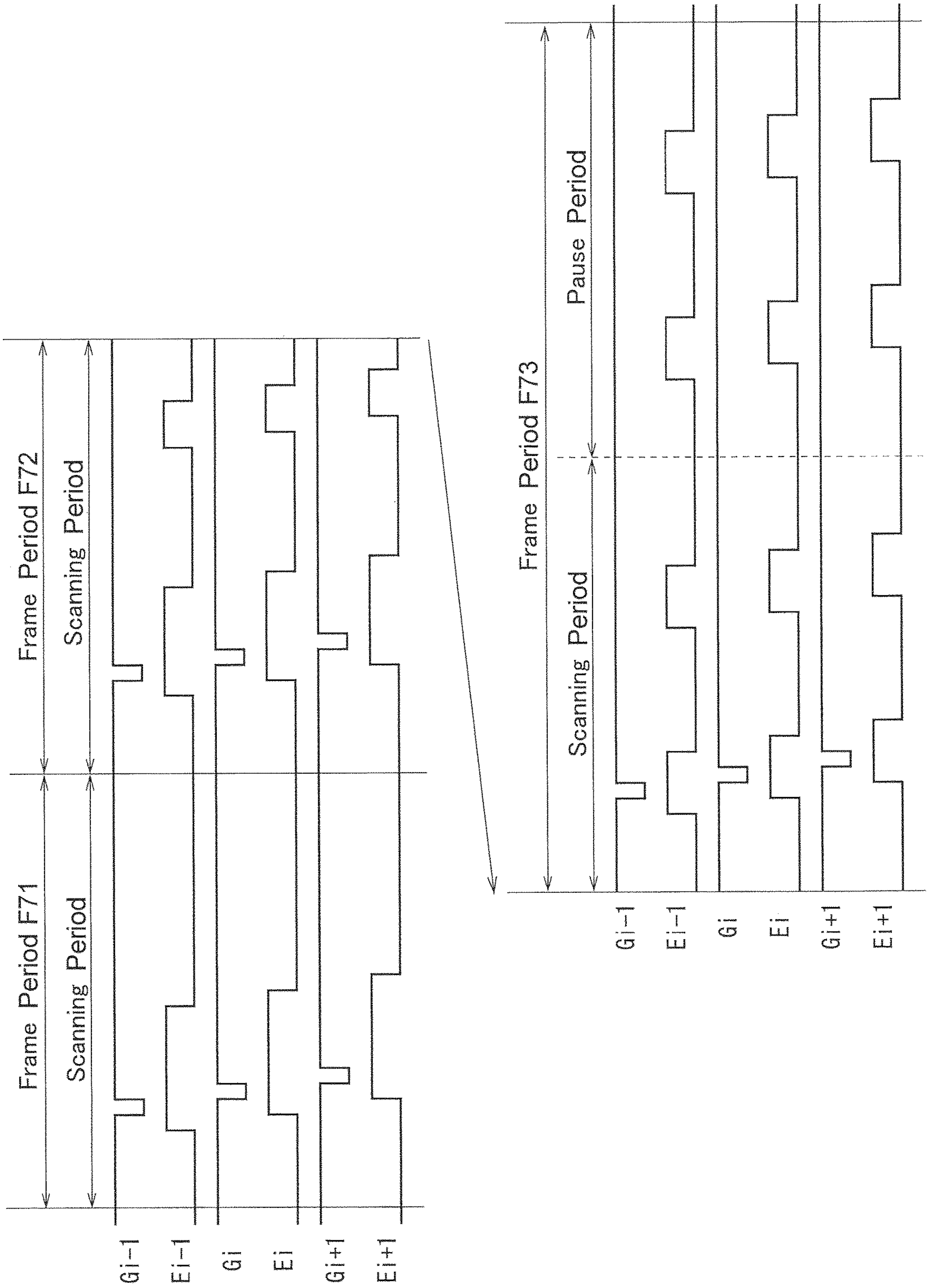
FIG. 28 is a timing chart for the display device according to the fifth embodiment.

FIG. 26 is a diagram showing the emission start pulse EMSP where the display device according to the present embodiment switches from the third to the fourth operation mode. FIG. 27 is a diagram showing emission states for the above case. FIG. 28 is a timing chart for the above case. The emission start pulse EMSP changes as shown in FIGS. 26 and 27 during frame periods F71 to F73. The display portion 11 emits light during emission sections shown in FIG. 27, and emits no light during other sections.

As shown in FIG. 26, the frame period F71 includes an emission period being set in the same manner as in the frame period F14. The frame period F73 is twice as long as the frame period F71. The frame period F73 consists of a scanning period and a pause period. The scanning period lasts for the first half of the frame period F73, and the pause period lasts for the rest of the frame period F73. The frame period F73 includes four emission periods and four non-emission periods, and each non-emission period has a duration Tx. The frame periods F71 and F73 are intervened by the frame period F72. The frame period F72 includes emission periods being set in the same manner as in the frame period F22.

The frame periods F71, F72, and F73 are regarded as leading, transition, and trailing frame periods, respectively. The leading frame period F71 and the transition frame period F72 are normal frame periods. The trailing frame period F73 is a compound frame period. The scanning period of the trailing frame period F73 being set as a compound frame period has the same proportion of emission periods as the leading frame period F71. The scanning period has the same number of emission periods as the transition frame period F72.

Figure 29:
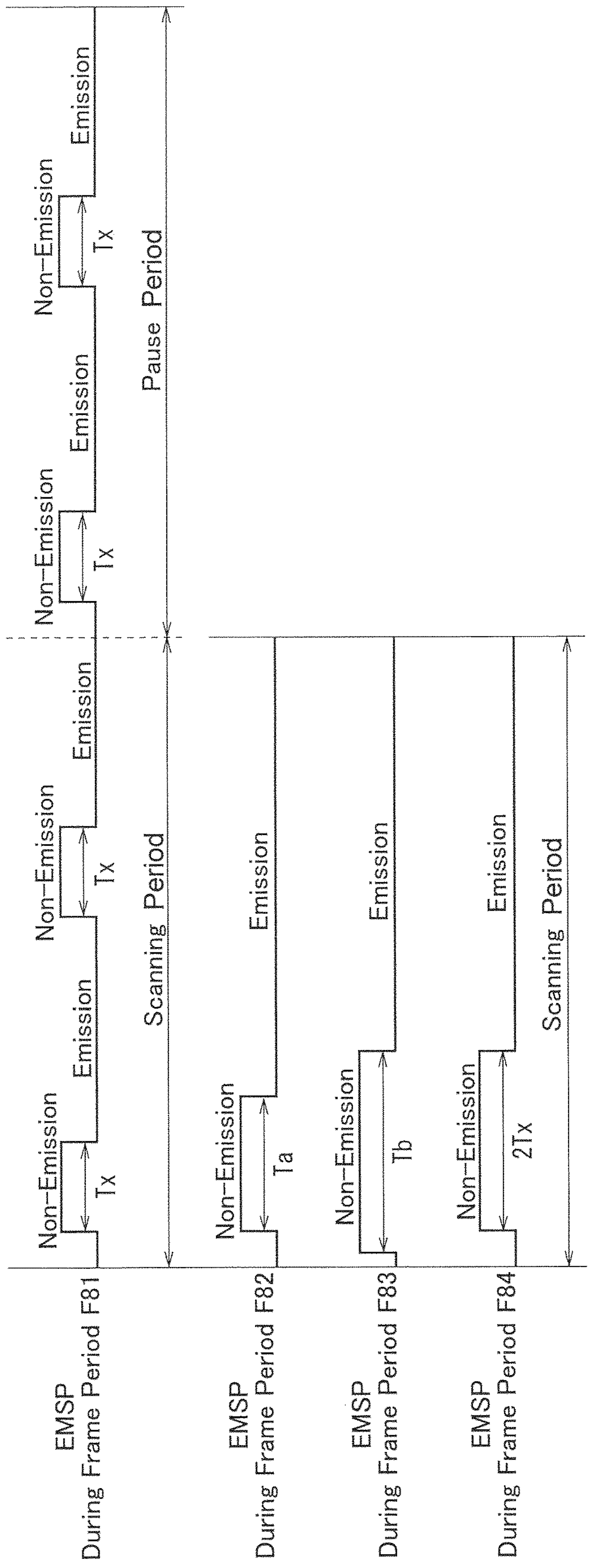
FIG. 29 is another diagram showing an emission start pulse for the display device according to the fifth embodiment.
Figure 30:
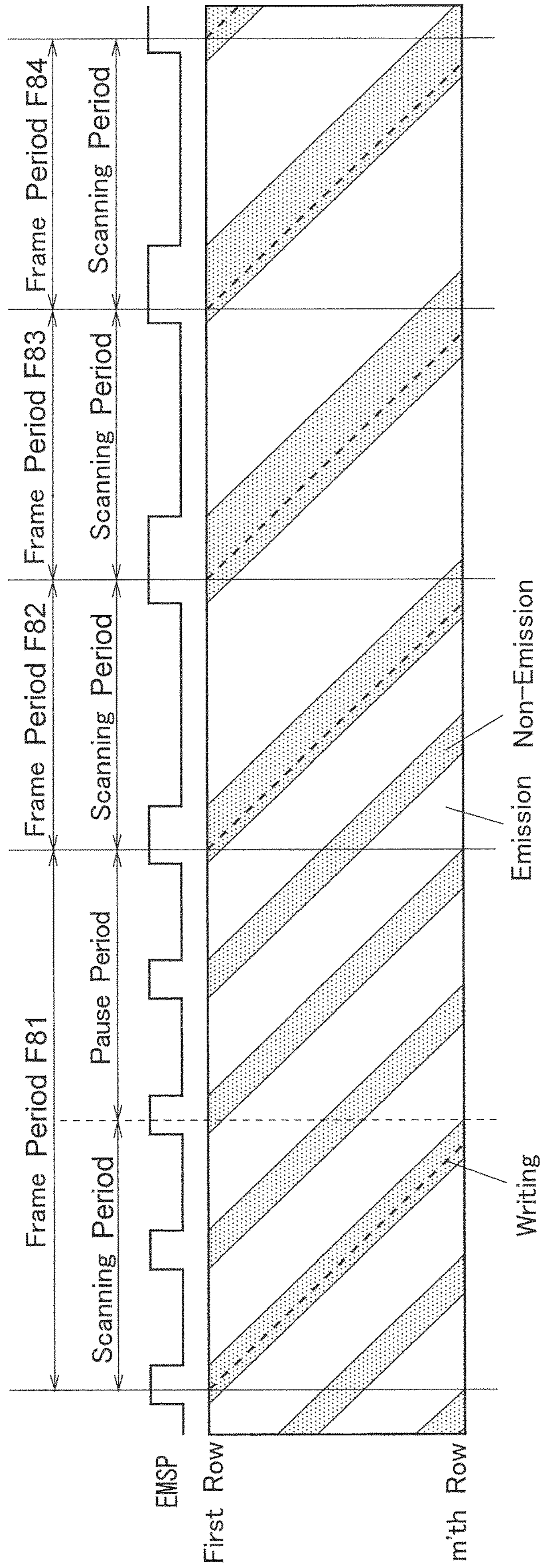
FIG. 30 is another diagram showing emission states for the display device according to the fifth embodiment.
Figure 31:
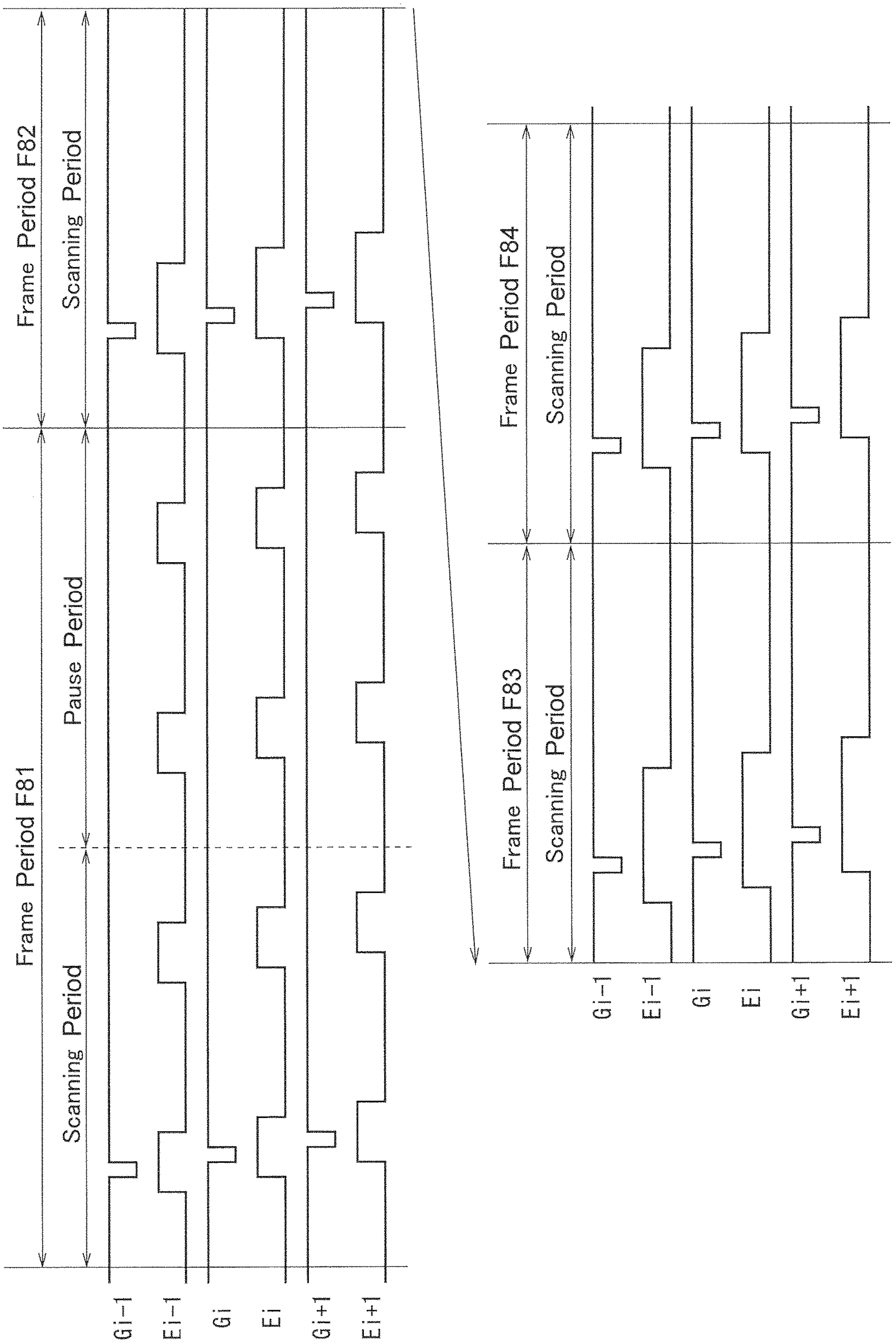
FIG. 31 is another timing chart for the display device according to the fifth embodiment.

FIG. 29 is a diagram showing the emission start pulse EMSP where the display device according to the present embodiment switches from the fourth to the third operation mode. FIG. 30 is a diagram showing emission states for the above case. FIG. 31 is a timing chart for the above case. The emission start pulse EMSP changes as shown in FIGS. 29 and 30 during frame periods F81 to F84. The display portion 11 emits light during emission sections shown in FIG. 30, and emits no light during other sections.

As shown in FIG. 29, the frame period F84 includes an emission period being set in the same manner as in the frame period F14. The frame period F81 is twice as long as the frame period F84. The frame period F81 consists of a scanning period and a pause period. The scanning period lasts for the first half of the frame period F81, and the pause period lasts for the rest of the frame period F81. The frame period F81 includes emission periods being set in the same manner as in the frame period F73. The frame periods F81 and F84 are intervened by the two frame periods F82 and F83. The frame period F82 includes an emission period being set in the same manner as in the frame period F12. The frame period F83 includes an emission period being set in the same manner as in the frame period F13.

The frame periods F81, F82, F83, and F84 are regarded as leading, first transition, second transition, and trailing frame periods, respectively. The leading frame period F81 is a compound frame period. The first transition frame period F82, the second transition frame period F83, and the trailing frame period F84 are normal frame periods. The scanning period of the leading frame period F81 being set as a compound frame period has the same proportion of emission periods as the trailing frame period F84. The scanning period includes more emission periods than the first transition frame period F82 and the second transition frame period F83.

In the case of the display device according to the present embodiment, as with the display devices according to the third and fourth embodiments, where switching between the operation modes occurs during a transition from the leading frame period to the trailing frame period, the leading frame period and the trailing frame period are intervened by one or two transition frame periods having a different proportion or proportions of emission periods from the leading frame period. Accordingly, by employing such a transition frame period or periods different from the leading frame period in terms of the proportion of emission periods, it is rendered possible to set a proper non-emission period within the trailing frame period and thereby prevent flickering caused by the switching between the operation modes.

As for the display devices according to the embodiments described above, numerous variants can be configured. For example, in a display device according to a variant, the leading frame period and the trailing frame period may be intervened by three or more transition frame periods. Increasing the number of transition frame periods results in more time required to change the number of light emissions, but setting emission periods within three or more transition frame periods renders it possible to more effectively prevent flickering caused by the changing of the number of light emissions per frame period.

In a variant, the display device may optionally include pixel circuits capable of controlling the emission state of display elements. In the display device according to this variant, the pixel circuits or other elements outside the pixel circuits may compensate for characteristics of drive elements. In another variant, the display device may optionally include an emission control line driver circuit configured to add sequential delays to a control signal provided thereto and thereby generate signals to be applied to the emission control lines. In another variant, the display device may adjust the observed luminance by modifying source voltages, data voltages, input data, etc., as well as by changing the number of light emissions.

While the display devices that include pixel circuits incorporating light-emitting elements have been described, taking as examples some organic EL display devices that include pixel circuits incorporating organic EL elements (or organic light-emitting diodes), inorganic EL display devices that include pixel circuits incorporating inorganic light-emitting diodes, QLED (quantum-dot light-emitting diode) display devices that include pixel circuits incorporating quantum-dot light-emitting diodes, and LED display devices that include pixel circuits incorporating mini or micro LEDs may be configured similarly to the display devices described above. Moreover, display devices with combined features of the above embodiments and variants may be configured by arbitrarily combining the features of the display devices described above without contradicting the nature of such combined features.

DESCRIPTION OF THE REFERENCE CHARACTERS

10 display device
11 display portion
12 display control circuit
13 scanning line driver circuit
14 data line driver circuit
15 emission control line driver circuit
20 pixel circuit
30 unit circuit

The invention claimed is:

1. A display device comprising:
a display portion including a plurality of scanning lines, a plurality of data lines, a plurality of emission control lines, and a plurality of pixel circuits incorporating respective light-emitting elements;
a scanning line driver circuit configured to drive the scanning lines;
a data line driver circuit configured to drive the data lines;
an emission control line driver circuit configured to drive the emission control lines; and
a display control circuit configured to output a control signal to the emission control line driver circuit, the control signal specifying an emission period included in a frame period, wherein,
the emission control line driver circuit adds sequential delays to the control signal and thereby generates signals to be applied to the emission control lines,
when leading and trailing frame periods have the same proportion of emission periods but include different numbers of emission periods, the leading and trailing frame periods are intervened by at least one transition frame period having a different proportion of emission periods from the leading frame period, and
the at least one transition frame period includes first and second transition frame periods intervening between the leading and trailing frame periods, and the second transition frame period has a different proportion of emission periods from the first transition frame period.

2. The display device according to claim 1, wherein the at least one transition frame period includes an emission period that differs in start time from the emission periods included in either the leading or trailing frame period or both.

3. The display device according to claim 1, wherein the at least one transition frame period includes an emission period that differs in end time from the emission periods included in either the leading or trailing frame period or both.

4. The display device according to claim 1, wherein the at least one transition frame period includes an emission period that differs from the emission periods included in the leading and trailing frame periods.

5. The display device according to claim 1, wherein the at least one transition frame period includes the same number of emission periods as the trailing frame period.

6. The display device according to claim 1, wherein the second transition frame period includes an emission period that differs in either start or end time or both from an emission period included in the first transition frame period.

7. The display device according to claim 1, wherein,
the trailing frame period includes fewer emission periods than the leading frame period,
the first transition frame period includes fewer emission periods than the leading frame period but has a higher proportion of emission periods than the leading frame period,
the second transition frame period includes the same number of emission periods as the first transition frame period but has a lower proportion of emission periods than the first transition frame period, and
the trailing frame period includes the same number of emission periods as the second transition frame period.

8. The display device according to claim 1, wherein the leading frame period includes two emission periods, and the trailing frame period includes one emission period.

9. The display device according to claim 1, wherein, the trailing frame period includes more emission periods than the leading frame period, the first transition frame period includes more emission periods than the leading frame period but has a lower proportion of emission periods than the leading frame period, the second transition frame period includes the same number of emission periods as the first transition frame period but has a higher proportion of emission periods than the first transition frame period, and the trailing frame period includes the same number of emission periods as the second transition frame period.

10. The display device according to claim 1, wherein the leading frame period includes one emission period, and the trailing frame period includes two emission periods.

11. The display device according to claim 1, wherein, one of either the leading or trailing frame period is a normal frame period consisting solely of a scanning period, and the other is a compound frame period including a scanning period and a pause period.

12. The display device according to claim 11, wherein the scanning period of the compound frame period includes the same proportion of emission periods as the normal frame period.

13. The display device according to claim 11, wherein the scanning period of the compound frame period includes the same number of emission periods as the at least one transition frame period.

14. A display device comprising:

a display portion including a plurality of scanning lines, a plurality of data lines, a plurality of emission control lines, and a plurality of pixel circuits incorporating respective light-emitting elements;

a scanning line driver circuit configured to drive the scanning lines;

a data line driver circuit configured to drive the data lines;

an emission control line driver circuit configured to drive the emission control lines; and a display control circuit configured to output a control signal to the emission control line driver circuit, the control signal specifying an emission period included in a frame period, wherein, the emission control line driver circuit adds sequential delays to the control signal and thereby generates signals to be applied to the emission control lines, when leading and trailing frame periods have the same proportion of emission periods but include different numbers of emission periods, the leading and trailing frame periods are intervened by at least one transition frame period having a different proportion of emission periods from the leading frame period, one of either the leading or trailing frame period is a normal frame period consisting solely of a scanning period, and the other is a compound frame period including a scanning period and a pause period, and the scanning period of the compound frame period includes the same proportion of emission periods as the normal frame period.

15. A display device comprising:

a display portion including a plurality of scanning lines, a plurality of data lines, a plurality of emission control lines, and a plurality of pixel circuits incorporating respective light-emitting elements;

a scanning line driver circuit configured to drive the scanning lines;

a data line driver circuit configured to drive the data lines;

an emission control line driver circuit configured to drive the emission control lines; and a display control circuit configured to output a control signal to the emission control line driver circuit, the control signal specifying an emission period included in a frame period, wherein, the emission control line driver circuit adds sequential delays to the control signal and thereby generates signals to be applied to the emission control lines, when leading and trailing frame periods have the same proportion of emission periods but include different numbers of emission periods, the leading and trailing frame periods are intervened by at least one transition frame period having a different proportion of emission periods from the leading frame period, one of either the leading or trailing frame period is a normal frame period consisting solely of a scanning period, and the other is a compound frame period including a scanning period and a pause period, and the scanning period of the compound frame period includes the same number of emission periods as the at least one transition frame period.

* * * * *